United States Patent
Meng

(10) Patent No.: US 10,044,505 B2
(45) Date of Patent: Aug. 7, 2018

(54) STABLE DATA-PROCESSING IN A DISTRIBUTED COMPUTING ENVIRONMENT

(71) Applicant: SAS Institute Inc., Cary, NC (US)

(72) Inventor: Gang Meng, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 15/677,683

(22) Filed: Aug. 15, 2017

(65) Prior Publication Data
US 2018/0131516 A1 May 10, 2018

Related U.S. Application Data

(60) Provisional application No. 62/419,535, filed on Nov. 9, 2016.

(51) Int. Cl.
| | |
|---|---|
| *H04L 9/08* | (2006.01) |
| *H04L 9/00* | (2006.01) |
| *H04L 9/32* | (2006.01) |
| *H04L 9/30* | (2006.01) |
| *H04L 29/06* | (2006.01) |

(52) U.S. Cl.
CPC .......... *H04L 9/3073* (2013.01); *H04L 9/3242* (2013.01); *H04L 63/0428* (2013.01)

(58) Field of Classification Search
CPC .. H04L 9/3073; H04L 9/3242; H04L 63/0428
USPC ............................. 713/171; 380/262, 278, 44
See application file for complete search history.

(56) References Cited

U.S. PATENT DOCUMENTS

| | | | |
|---|---|---|---|
| 2008/0016240 A1* | 1/2008 | Balandin | G06F 17/30094 709/238 |
| 2014/0330884 A1 | 11/2014 | Meng | |
| 2016/0291942 A1* | 10/2016 | Hutchison | G06F 8/451 |
| 2016/0335288 A1* | 11/2016 | Qiu | G06F 17/30174 |
| 2016/0335299 A1* | 11/2016 | Vemulapati | G06F 17/30327 |
| 2017/0024272 A1* | 1/2017 | Cheriton | G06F 11/0706 |
| 2017/0046520 A1* | 2/2017 | Ohrimenko | G06F 21/602 |

(Continued)

OTHER PUBLICATIONS

Daily Scala zipWithIndex (May 27, 2010) retrieved from http://daily-scala.blogspot.com/2010/05/zipwithindex.html 3 pages.

*Primary Examiner* — Aravind K Moorthy
(74) *Attorney, Agent, or Firm* — Kilpatrick Townsend & Stockton LLP

(57) ABSTRACT

A node in a distributed computing environment can generate key-value pairs. The node can categorize the key-value pairs into bins, with each key-value pair being categorized into a bin spanning a range of hashed keys that includes a hashed key of the key-value pair. The node can determine nodes in the distributed computing environment that are mapped to the bins. The node can distribute each key-value pair to a node corresponding to a bin into which the key-value pair was categorized. The node can then sort any of the key-value pairs maintained on the node by hashed key or key to generate sorted key-value pairs. The node can assign index values to the sorted key-value pairs. The indexed key-value pairs may be the same each time the above process is run, regardless of the underlying topology of the distributed computing environment. This can result in stable data-processing.

30 Claims, 31 Drawing Sheets

(56) References Cited

U.S. PATENT DOCUMENTS

2017/0139596 A1\* 5/2017 Hack ...................... G06F 3/064
2017/0324716 A1\* 11/2017 Frincu .................. H04L 63/061

\* cited by examiner

| Bin | from | to (exclusive) | SendToNode | Phase |
|---|---|---|---|---|
| 0 | 0 | 20 | 1 | 1 |
| 1 | 20 | 40 | 2 | 1 |
| 2 | 40 | 60 | 3 | 1 |
| 3 | 60 | 80 | 1 | 2 |
| 4 | 80 | 100 | 2 | 2 |
| 5 | 100 | 120 | 3 | 2 |

FIG. 17

| SUBSET1 /NODE 1 | HASH | REPORT TO NODE | PHASE |
|---|---|---|---|
| 6'1" | 16 | 1 | 1 |
| 5'10" | 105 | 3 | 2 |
| 6'2" | 26 | 2 | 1 |
| 5'11" | 115 | 3 | 2 |
| 6'3" | 36 | 2 | 1 |
| 5'6" | 65 | 1 | 2 |
| 6'0" | 6 | 1 | 1 |
| 5'5" | 55 | 3 | 1 |

1904a — 1906a — 2004 — 2006 — 2008

| SUBSET2 /NODE 2 | HASH | REPORT TO NODE | PHASE |
|---|---|---|---|
| 5'11" | 115 | 3 | 2 |
| 5'7" | 75 | 1 | 2 |
| 6'0" | 6 | 1 | 1 |
| 5'8" | 85 | 2 | 2 |
| 5'6" | 65 | 1 | 2 |
| 5'9" | 95 | 2 | 2 |
| 6'1" | 16 | 1 | 1 |
| 5'10" | 105 | 3 | 2 |

1904b — 1906b

| SUBSET3 /NODE 3 | HASH | REPORT TO NODE | PHASE |
|---|---|---|---|
| 6'1" | 16 | 1 | 1 |
| 6'0" | 6 | 1 | 1 |
| 5'5" | 55 | 3 | 1 |
| 6'3" | 36 | 2 | 1 |
| 5'7" | 75 | 1 | 2 |
| 5'8" | 85 | 2 | 2 |
| 5'10" | 105 | 3 | 2 |
| 6'2" | 26 | 2 | 1 |

STABLE DATA-PROCESSING IN A DISTRIBUTED COMPUTING ENVIRONMENT

REFERENCE TO RELATED APPLICATION

This claims the benefit of priority under 35 U.S.C. § 119(e) to U.S. Provisional Patent Application No. 62/419,535, filed Nov. 9, 2016, the entirety of which is hereby incorporated by reference herein.

TECHNICAL FIELD

The present disclosure relates generally to database and file management. More specifically, but not by way of limitation, this disclosure relates to stable data-processing in a distributed environment.

BACKGROUND

A distributed computing environment can include multiple nodes in communication with each other over a network for processing data. Examples of a node can include a computing device, a server, a virtual machine, or any combination of these. The nodes can each process at least a portion of the data and provide a result. But the results from the nodes can depend on the number of nodes that are in the distributed computing environment. This may lead to inconsistent results as the number of nodes in the distributed computing environment changes.

SUMMARY

One example of the present disclosure involves a method for distributing data among nodes in a distributed computing environment to provide for stable data-processing. The method can include generating, by a node of the distributed computing environment, a plurality of key-value pairs as part of a job. Each key-value pair of the plurality of key-value pairs can have a respective hashed key and a corresponding value. The method can include performing, by the node, the job at least in part by organizing the plurality of key-value pairs among a set of nodes in the distributed computing environment using an organizational process. The organizational process can include categorizing the plurality of key-value pairs into a plurality of bins. Each key-value pair of the plurality of key-value pairs can be categorized into a bin of the plurality of bins spanning a range of hashed keys that includes the respective hashed key. The organizational process can include determining that the set of nodes in the distributed computing environment are mapped to the plurality of bins. Each bin of the plurality of bins can be mapped to a single node of the set of nodes. The organizational process can include distributing each respective key-value pair in the plurality of key-value pairs to a respective node corresponding to a respective bin into which the respective key-value pair is categorized. The organizational process can include sorting a subset of the plurality of key-value pairs maintained on the node by at least one of hashed key or key to generate sorted key-value pairs. The organizational process can include assigning index values to the sorted key-value pairs in an ascending order or a descending order and based on a predetermined rank of the node among the set of nodes to generate a set of indexed key-value pairs. The set of indexed key-value pairs can be usable to determine a result of the job.

In another example, a non-transitory computer readable medium comprising instructions executable by a processor is provided. The instructions can be for distributing data among nodes in a distributed computing environment to provide for stable data-processing. The instructions can be for causing the processing device to generate a plurality of key-value pairs as part of a job. Each key-value pair of the plurality of key-value pairs can have a respective hashed key and a corresponding value. The instructions can be for causing the processing device to perform the job at least in part by organizing the plurality of key-value pairs among a set of nodes in the distributed computing environment using an organizational process. The organizational process can include categorizing the plurality of key-value pairs into a plurality of bins. Each key-value pair of the plurality of key-value pairs can be categorized into a bin of the plurality of bins spanning a range of hashed keys that includes the respective hashed key. The organizational process can include determining that the set of nodes in the distributed computing environment are mapped to the plurality of bins. Each bin of the plurality of bins can be mapped to a single node of the set of nodes. The organizational process can include distributing each respective key-value pair in the plurality of key-value pairs to a respective node corresponding to a respective bin into which the respective key-value pair is categorized. The organizational process can include sorting a subset of the plurality of key-value pairs maintained on the node by at least one of hashed key or key to generate sorted key-value pairs. The organizational process can include assigning index values to the sorted key-value pairs in an ascending order or a descending order and based on a predetermined rank of the node among the set of nodes to generate a set of indexed key-value pairs. The set of indexed key-value pairs can be usable to determine a result of the job.

In another example, a system is provided that can include a processing device and a memory device. The memory device can include instructions executable by the processing device for causing the processing device to generate a plurality of key-value pairs as part of a job. Each key-value pair of the plurality of key-value pairs can have a respective hashed key and a corresponding value. The instructions can be for causing the processing device to perform the job at least in part by organizing the plurality of key-value pairs among a set of nodes in the distributed computing environment using an organizational process. The organizational process can include categorizing the plurality of key-value pairs into a plurality of bins. Each key-value pair of the plurality of key-value pairs can be categorized into a bin of the plurality of bins spanning a range of hashed keys that includes the respective hashed key. The organizational process can include determining that the set of nodes in the distributed computing environment are mapped to the plurality of bins. Each bin of the plurality of bins can be mapped to a single node of the set of nodes. The organizational process can include distributing each respective key-value pair in the plurality of key-value pairs to a respective node corresponding to a respective bin into which the respective key-value pair is categorized. The organizational process can include sorting a subset of the plurality of key-value pairs maintained on the node by at least one of hashed key or key to generate sorted key-value pairs. The organizational process can include assigning index values to the sorted key-value pairs in an ascending order or a descending order and based on a predetermined rank of the node among the set of nodes to generate a set of indexed key-value pairs. The set of indexed key-value pairs can be usable to determine a result of the job.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures:

FIG. 17 is a table illustrating an example of a mapping of the bins in FIG. 16 to nodes and phases according to some aspects.

FIG. 20 is a set of tables showing an example of the data set in FIG. 19 after distribution and with hash values according to some aspects.

DETAILED DESCRIPTION

Figure 1:
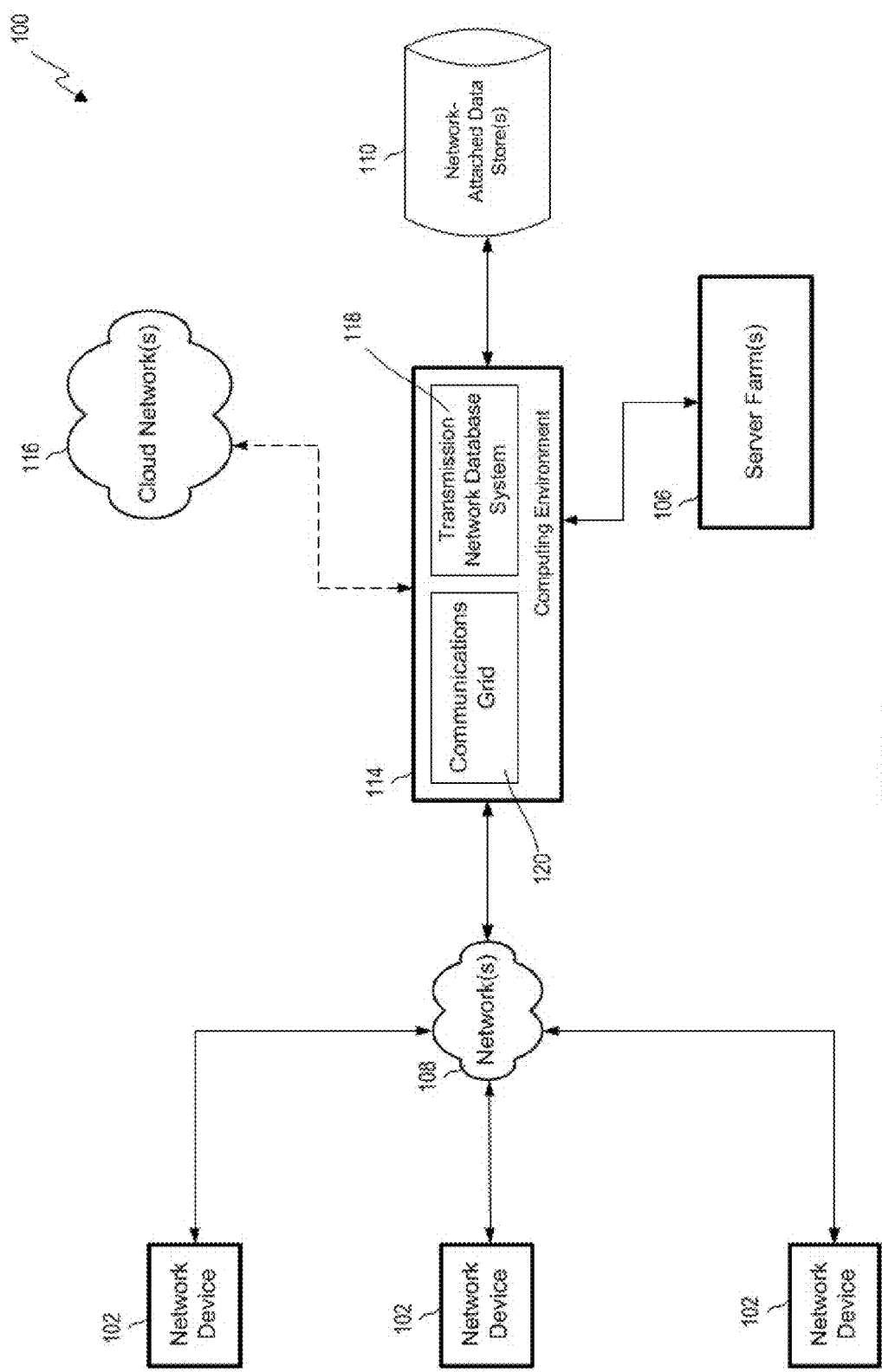
FIG. 1 is a block diagram of an example of the hardware components of a computing system according to some aspects.

In the following description, for the purposes of explanation, specific details are set forth in order to provide a thorough understanding of examples of the technology. But various examples can be practiced without these specific details. The figures and description are not intended to be restrictive.

The ensuing description provides examples only, and is not intended to limit the scope, applicability, or configuration of the disclosure. Rather, the ensuing description of the examples provides those skilled in the art with an enabling description for implementing an example. Various changes may be made in the function and arrangement of elements without departing from the spirit and scope of the technology as set forth in the appended claims.

Specific details are given in the following description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples can be described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but can have additional operations not included in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

Certain aspects and features of the present disclosure relate to distributing data among nodes in a distributed computing environment using an organizational process that provides for stable data-processing. Stable data-processing can refer to processing data in a manner that yields substantially consistent results each time the data is processed, regardless of the underlying topology (e.g., the number of nodes) of the distributed computing environment or the initial distribution of data among nodes of the distributed computing environment. But not all distributed computing environments process data in a stable manner. For example, the results from some distributed computing environments may change as nodes are added to or removed from the distributed computing environment, leading to instability. Some examples of the present disclosure can overcome one or more of these issues by using an organizational process that results in consistent outputs from the distributed computing environment.

As a particular example, a node in a distributed computing environment can receive or generate multiple key-value pairs as a part of a job. A key-value pair can include a key and a value associated with the key. In some examples, the value can be optional or implied (e.g., not expressly incorporated into a key-value pair). For example, a dataset can expressly include a key that has an implied (e.g., default) value of 1, whereby the key and the implied value of 1 create a key-value pair. In some examples, the node can use the organizational process to select the other nodes in which to distribute the key-value pairs. For example, the node can categorize the key-value pairs into bins. Each bin can span a range of values (e.g., hashed values) and can be mapped to a node in the distributed computing environment. For example, each bin can span a range of hashed keys, where a hashed key can be a hashed value of a key in a key-value pair. The node can correlate the bins to a group of nodes in the distributed computing environment. The node can then distribute the key-value pairs among the group of nodes.

In some examples, the node can further index a subset of the key-value pairs that are retained on the node according to an indexing scheme. The indexing scheme can include sorting the subset of key-value pairs by hashed key, key, value, or any combination of these to generate sorted key-value pairs. Index values can then be assigned to the sorted key-value pairs based on a predefined order (e.g., an ascending order or descending order), a predetermined rank of the node among the group of nodes, or both of these. This results in indexed key-value pairs. In some examples, the node processes the indexed key-value pairs to determine a result associated with the job. Some or all of the nodes in the distributed computing environment can follow this indexing scheme, process their respective indexed key-value pairs, and produce results.

Some examples of the present disclosure can provide for stable data-processing over the course of distributed-computing-environment topology changes, multiple phases of processing, and/or other distributed computing environment changes. For example, the organizational process can help ensure that key-value pairs maintain the same order from run to run, regardless of how many nodes the key-value pairs are divided among. By maintaining the order of the key-value pairs, the output from the distributed computing environment can be the same, regardless of how the grid topology changes.

Some examples of the present disclosure improve distributed computing environments by helping to ensure that the output from the distributed computing environments are the same, regardless of how the grid topology changes. This can amount to an improvement to the distributed computing environment itself.

Some examples of the present disclosure can also improve any technology that relies on a distributed computing environment (e.g., with a changeable grid topology) for processing information. For example, a robot can use a distributed computing environment to analyze information, such as three-dimensional information from sensors, to navigate through the world. And some examples of the present disclosure can help ensure that the results of that analysis are the same each time the analysis is performed, regardless of how the grid topology of the distributed computing environment changes. This can help ensure, for example, that the robot consistently perceives the same objects in the same positions in real space to avoid colliding with the objects. Other machines that rely on a distributed computing environment can also have improved performance due to the consistent results provided by some examples.

Some examples of the present disclosure can also improve the quality and experience of the developing process of software that runs in a distributed computing environment. For example, regression test cases can be set up and run without worrying about a difference in results caused by the underlying topology of the distributed computing environment. As another example, a repeatable and random sample of a big data set can be obtained from run-to-run by applying the disclosed indexing scheme on a key that uniquely identifies each value, and then taking the desired number of values from the beginning of, and in the order of, the index. A repeatable sample of a big data set is invaluable in the testing and developing of distributed algorithms.

FIGS. 1-12 depict examples of systems and methods usable for stable data-processing in a distributed computing environment according to some aspects. For example, FIG.

1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120. The computing environment 114 can include one or more processing devices (e.g., distributed over one or more networks or otherwise in communication with one another) that, in some examples, can collectively be referred to as a processor or a processing device.

Data transmission network 100 also includes one or more network devices 102. Network devices 102 may include client devices that can communicate with computing environment 114. For example, network devices 102 may send data to the computing environment 114 to be processed, may send communications to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices 102 can transmit electronic messages for use in stable data-processing in a distributed computing environment, all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data to be processed to a network-attached data store 110 for storage. The computing environment 114 may later retrieve the data from the network-attached data store 110 and distribute data among nodes in a distributed computing environment according to a process that provides for stable-data processing.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary, or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic communications. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the sever farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for stable data-processing in a distributed computing environment.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for stable data-processing in a distributed computing environment. For example, the computing environment 114, a network device 102, or both can implement one or more versions of the processes discussed with respect to FIGS. 12 and 15.

Figure 2:
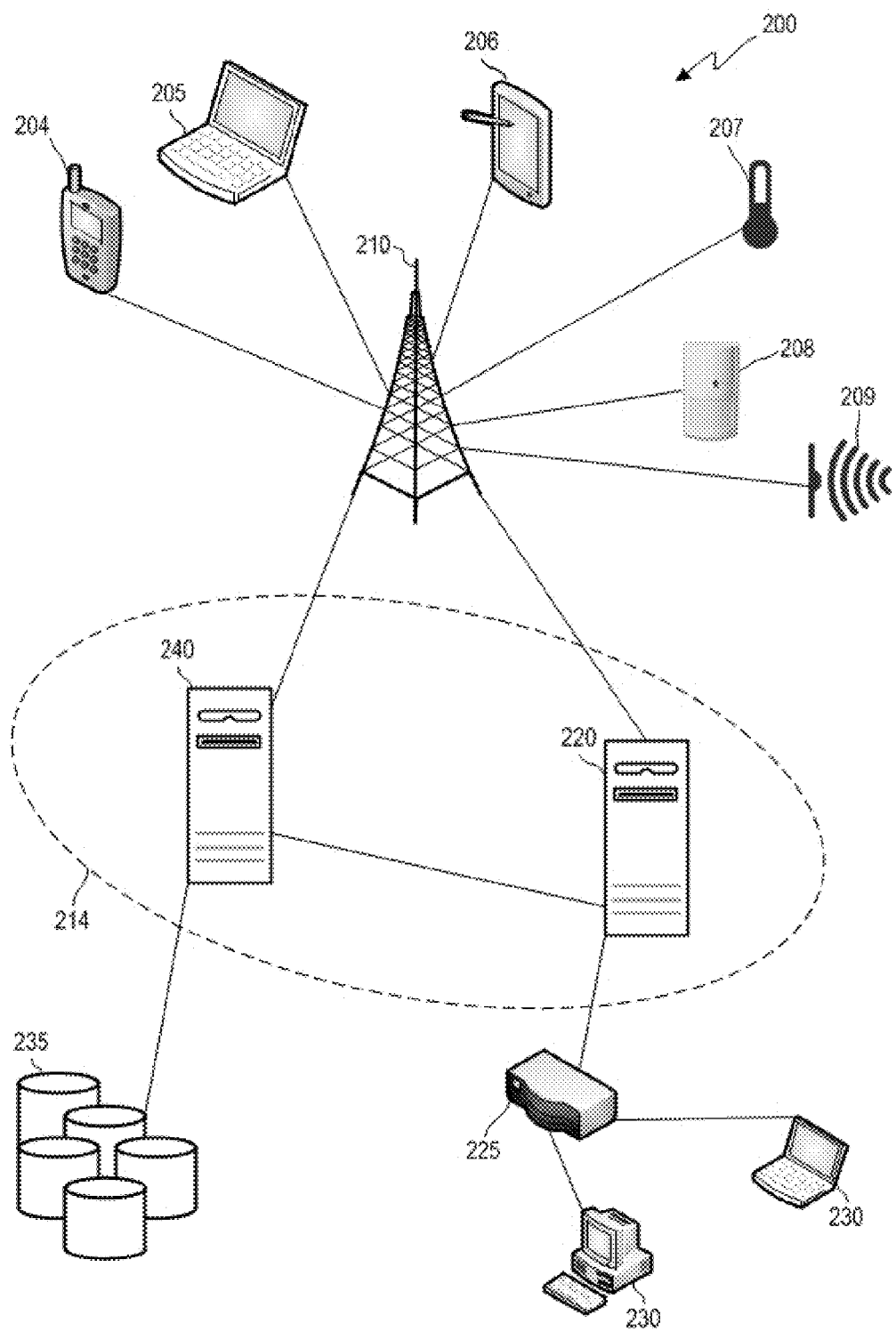
FIG. 2 is an example of devices that can communicate with each other over an exchange system and via a network according to some aspects.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include times series data. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can reformat the data before transmitting the data to the computing environment 214 for further processing (e.g., stable data-processing in a distributed computing environment).

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, electronic documents, social media posts (e.g., Twitter™ posts or Facebook™ posts), and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, as part of a project in which data is distributed among nodes in a distributed computing environment, the computing environment 214 can perform a pre-analysis of the data. The pre-analysis can include determining whether the data is in a correct format for distributing the data among nodes in a distributed computing environment for stable-data processing and, if not, reformatting the data into the correct format.

Figure 3:
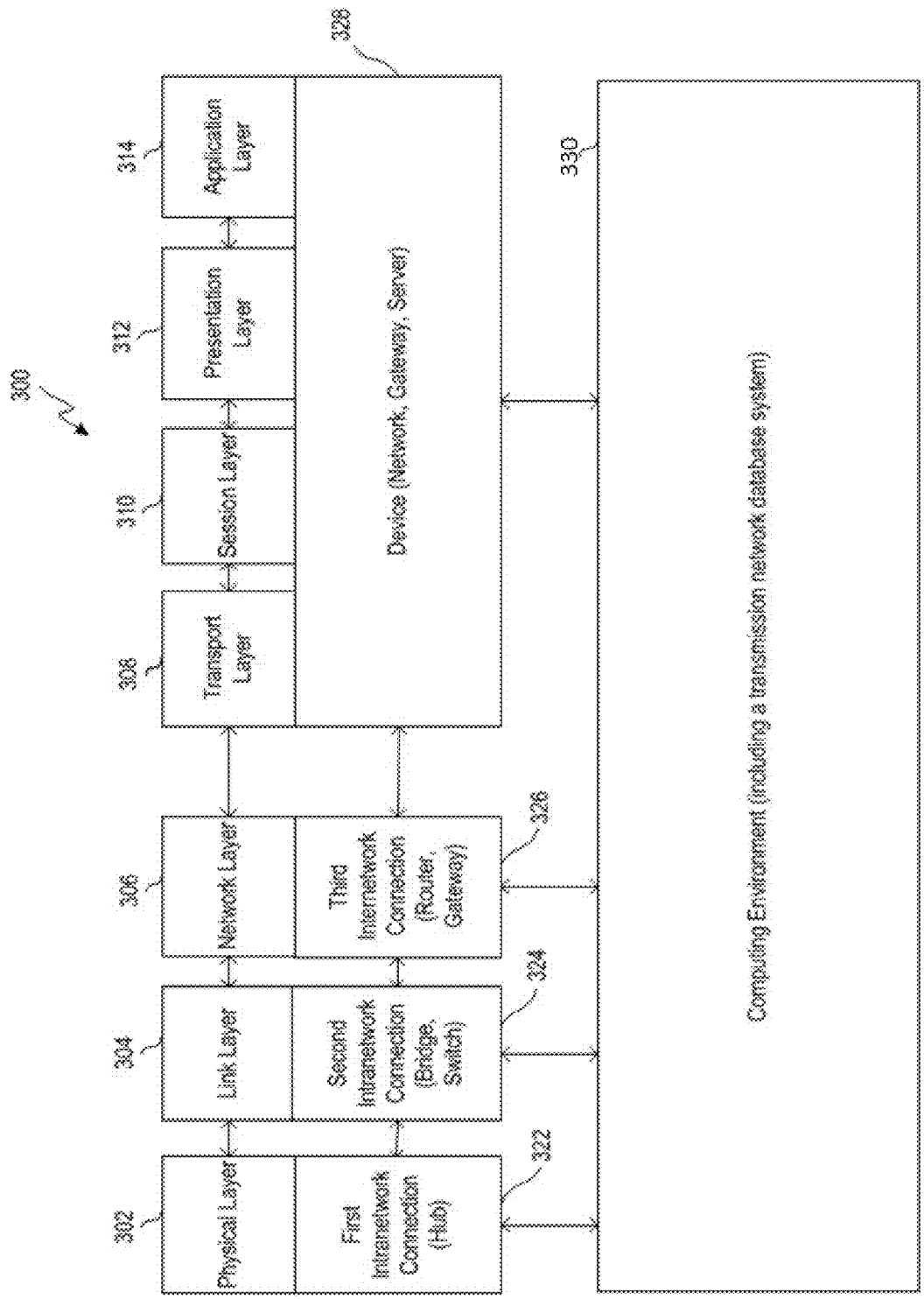
FIG. 3 is a block diagram of a model of an example of a communications protocol system according to some aspects.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic communications. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes a data set to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as an application for stable data-processing in a distributed computing environment, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326, 328 are shown to operate on higher levels, such as layers 306-314. For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control which devices from which it can receive data. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router, or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for stable data-processing in a distributed computing environment.

Figure 4:
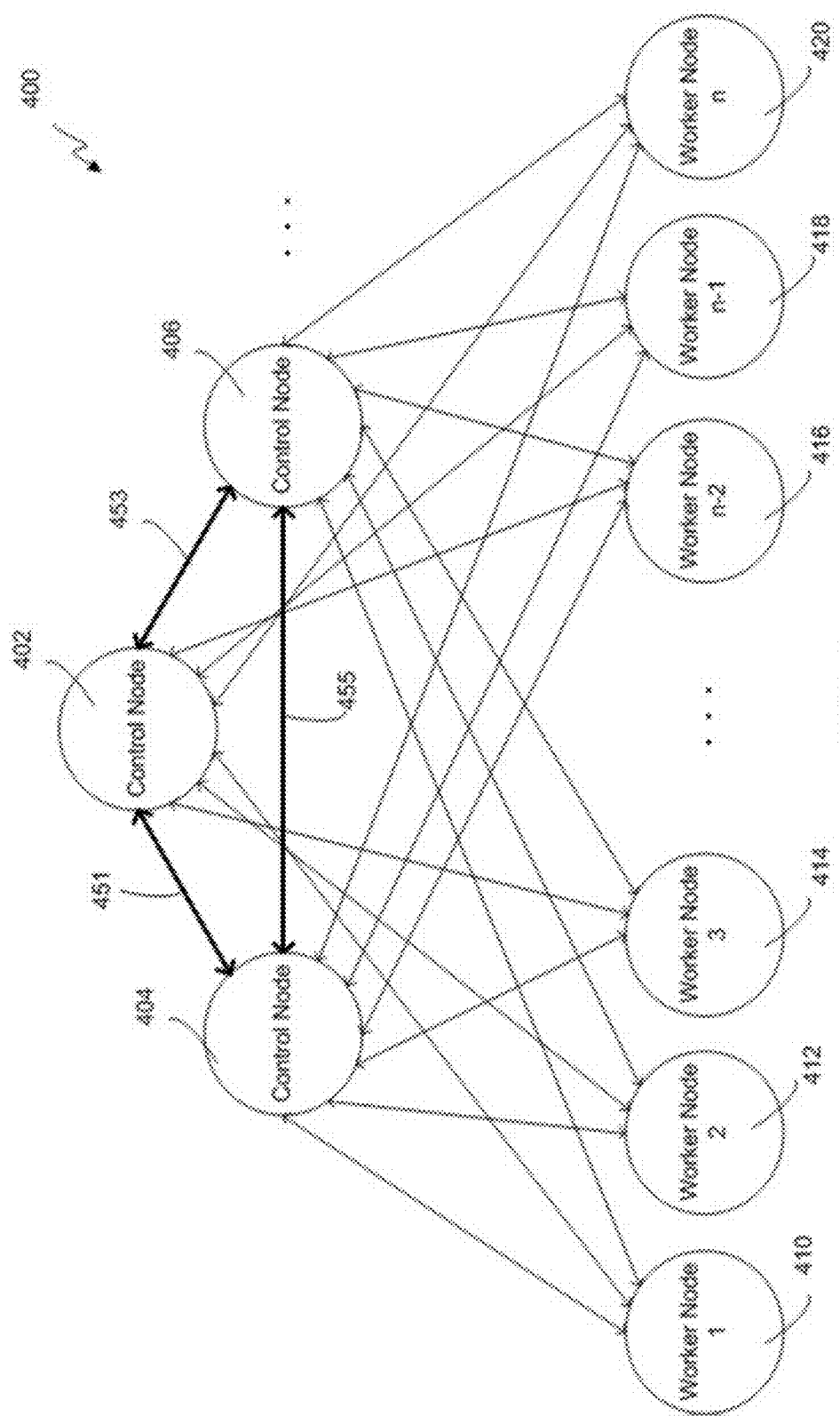
FIG. 4 is a hierarchical diagram of an example of a communications grid computing system including a variety of control and worker nodes according to some aspects.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes are communicatively connected via communication paths 451, 453, and 455. The control nodes 402-406 may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a job being performed or an individual task within a job being performed by that worker node. In some examples, worker nodes may not be connected (communicatively or otherwise) to certain other worker nodes. For example, a worker node 410 may only be able to communicate with a particular control node 402. The worker node 410 may be unable to communicate with other worker nodes 412-420 in the communications grid, even if the other worker nodes 412-420 are controlled by the same control node 402.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node, such as a project or job related to stable data-processing in a distributed computing environment. The project may include the data set. The data set may be of any size. Once the control node 402-406 receives such a project including a large data set, the control node may distribute the data set or projects related to the data set to be performed by worker nodes. Alternatively, for a project including a large data set, the data set may be receive or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer, or other external device may connect to the primary control node. Once the control node 402 receives a project, the primary control node may distribute portions of the project to its worker nodes for execution. For example, a project to be processed in a stable manner using a distributed computing environment can be initiated on communications grid computing system 400. A primary control node can control the work to be performed for the project in order to complete the project as requested or instructed. The primary control node may distribute work to the worker nodes 412-420 based on various factors, such as which subsets or portions of projects may be completed most efficiently and in the correct amount of time. For example, a worker node 412 may distribute data among nodes in a distributed computing environment using at least a portion of data that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 412-420 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed. In some examples, a communications grid computing system 400 can be used for stable data-processing.

Figure 5:
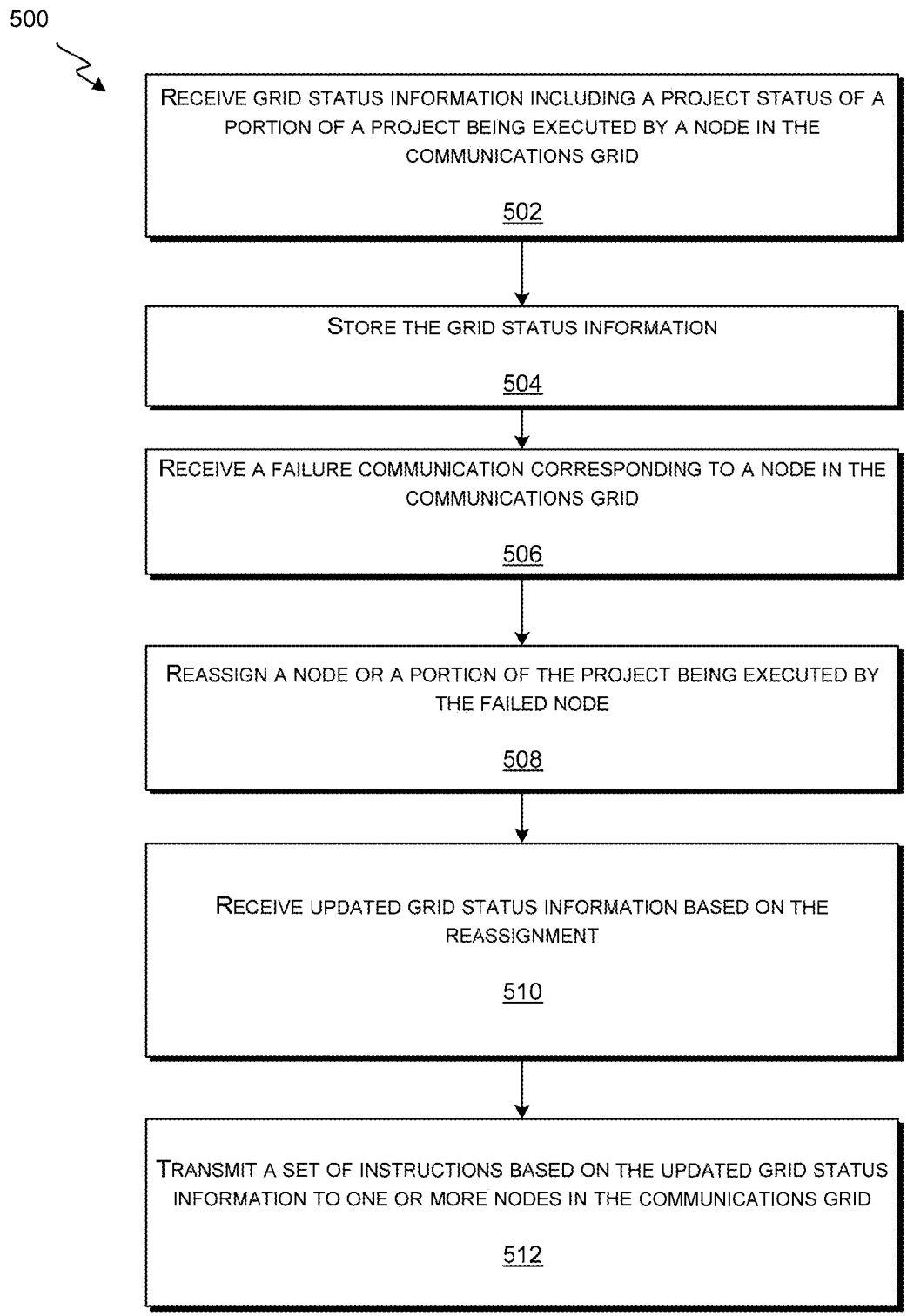
FIG. 5 is a flow chart of an example of a process for adjusting a communications grid or a work project in a communications grid after a failure of a node according to some aspects.

FIG. 5 is a flow chart of an example of a process for adjusting a communications grid or a work project in a communications grid after a failure of a node according to some aspects. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
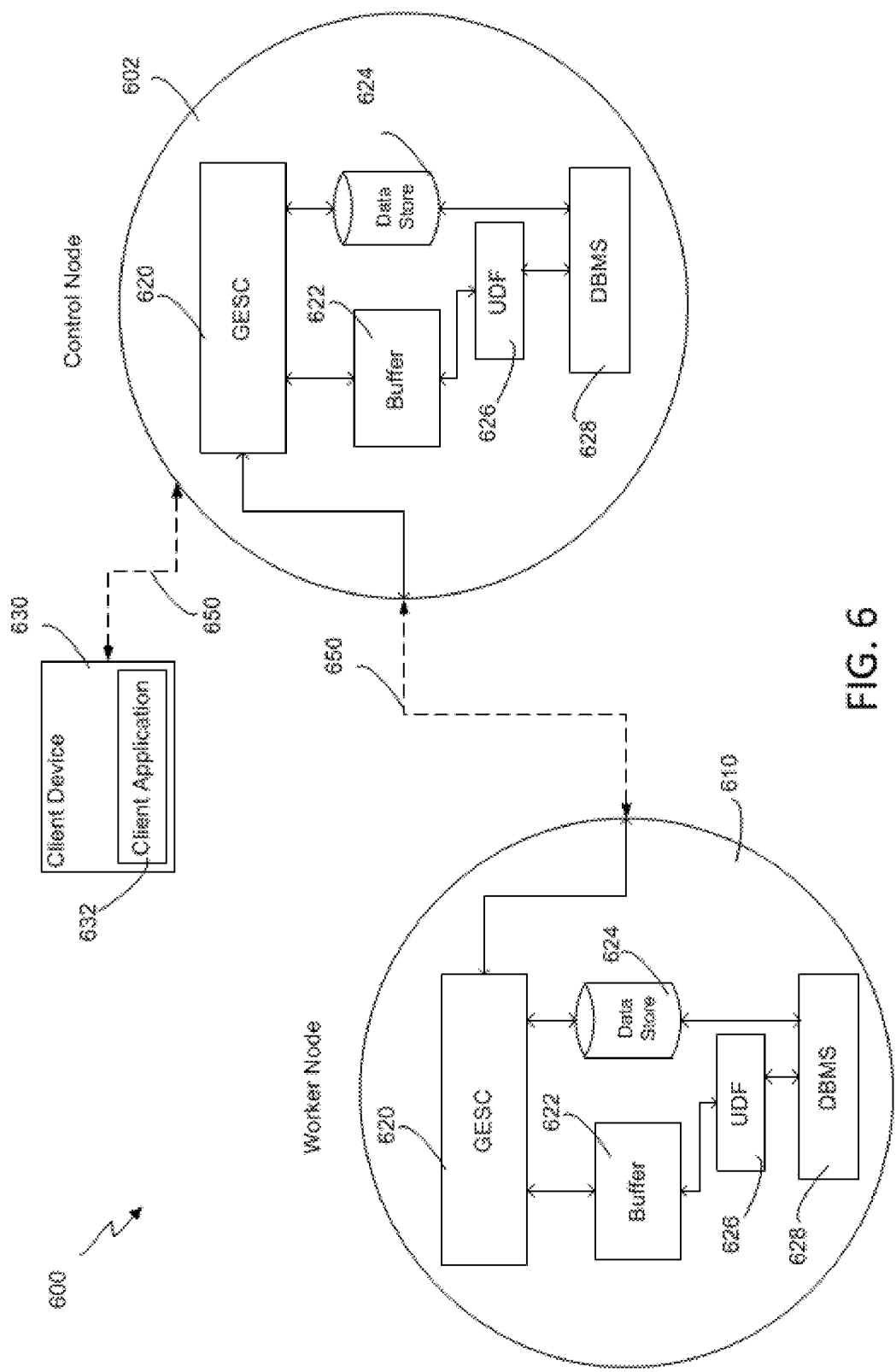
FIG. 6 is a block diagram of a portion of a communications grid computing system including a control node and a worker node according to some aspects.

FIG. 6 is a block diagram of a portion of a communications grid computing system 600 including a control node and a worker node according to some aspects. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via communication path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain examples, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
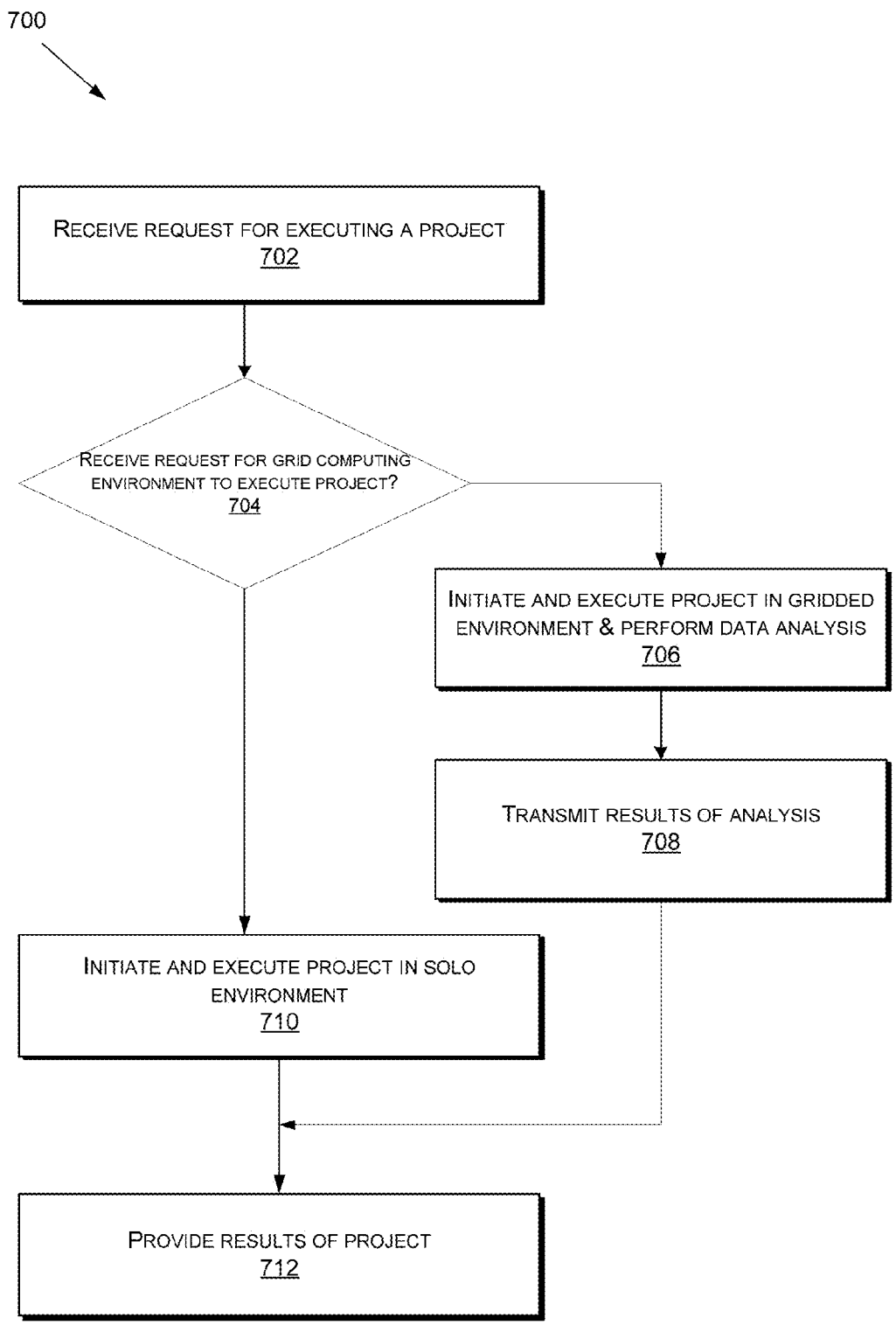
FIG. 7 is a flow chart of an example of a process for executing a data analysis or processing project according to some aspects.

FIG. 7 is a flow chart of an example of a process for executing a data analysis or a processing project according to some aspects. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

Figure 8:
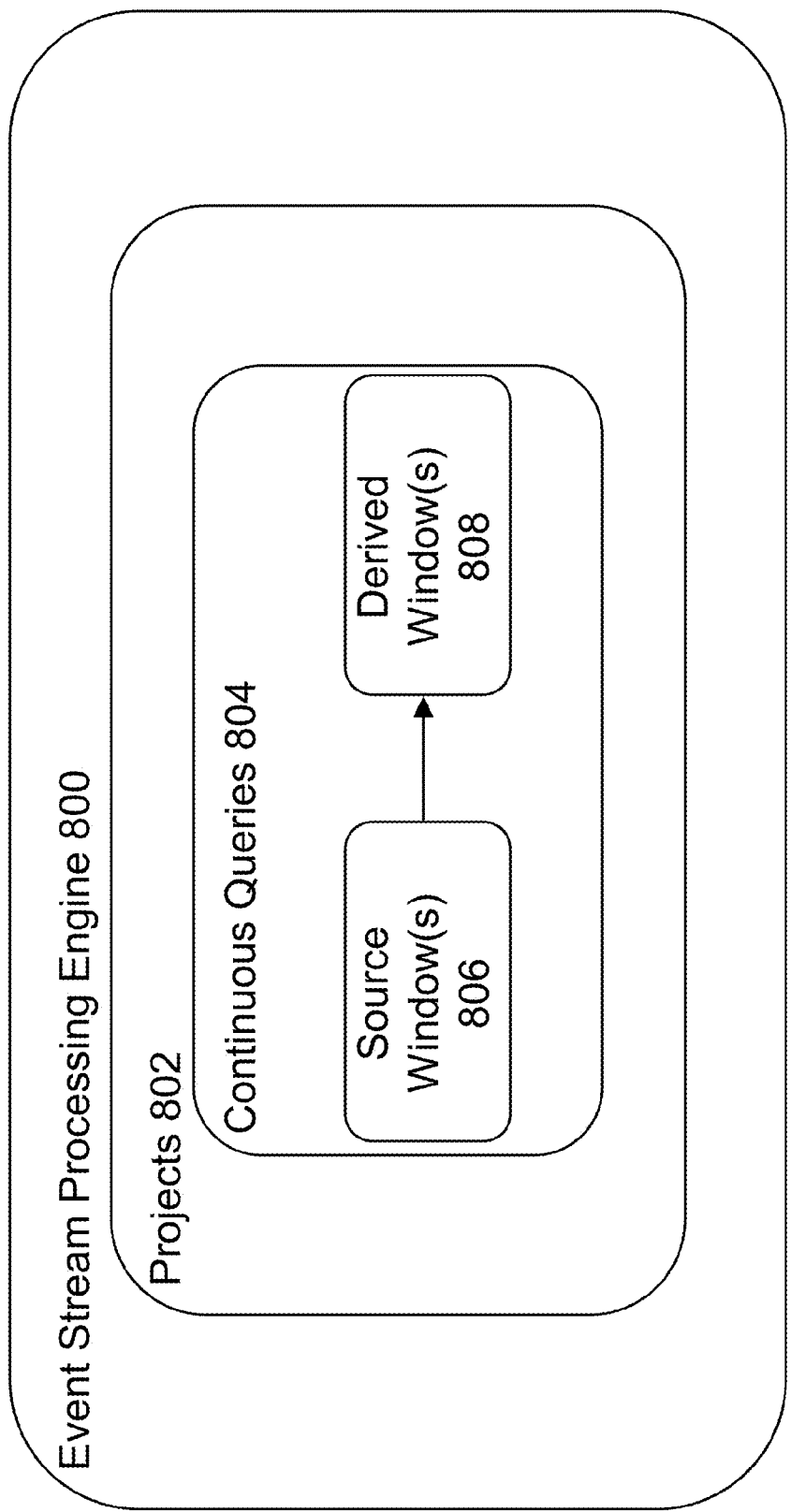
FIG. 8 is a block diagram including components of an Event Stream Processing Engine (ESPE) according to some aspects.

FIG. 8 is a block diagram including components of an Event Stream Processing Engine (ESPE) according to some aspects. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Figure 9:
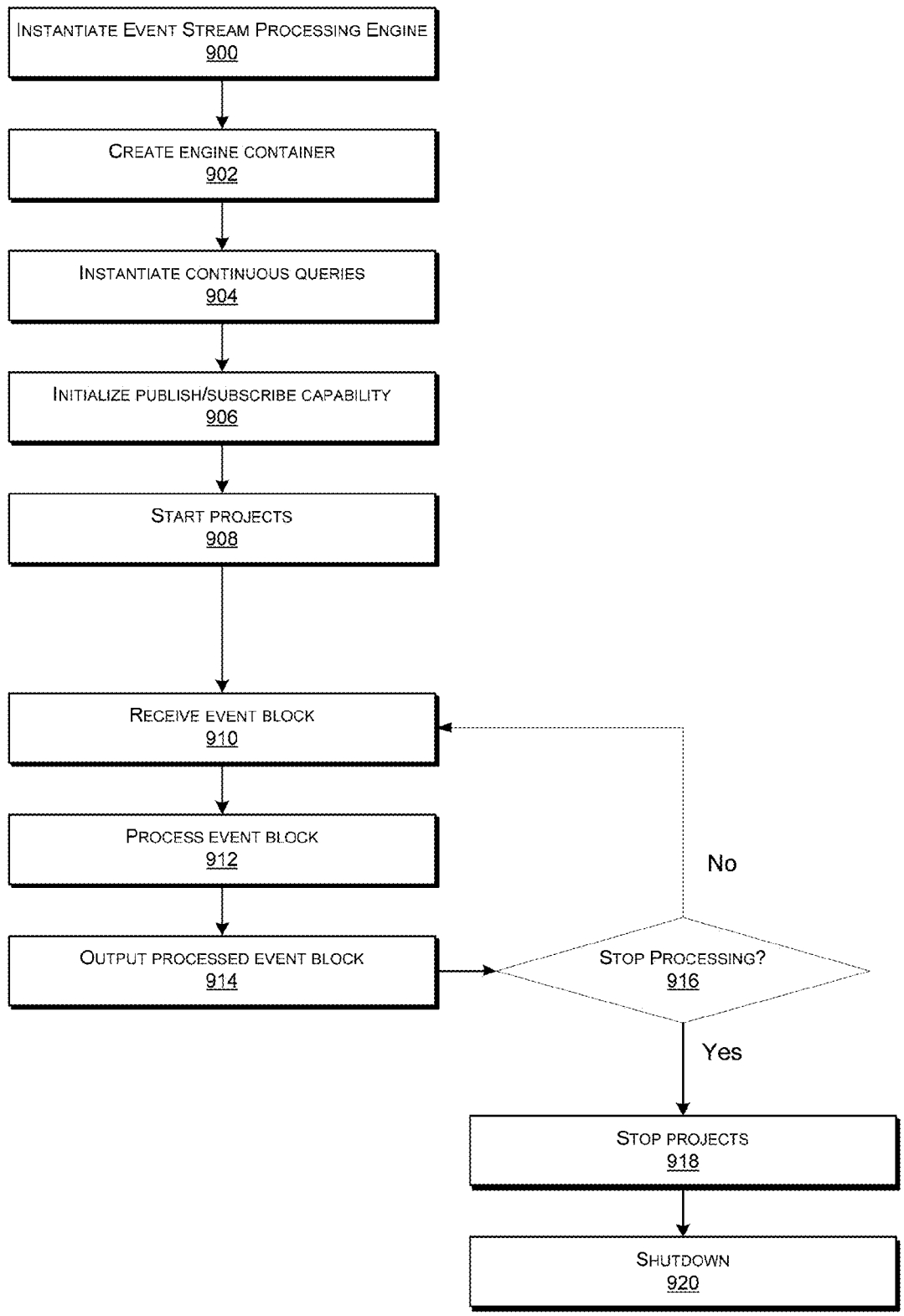
FIG. 9 is a flow chart of an example of a process including operations performed by an event stream processing engine according to some aspects.

FIG. 9 is a flow chart of an example of a process including operations performed by an event stream processing engine according to some aspects. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. Various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

Figure 10:
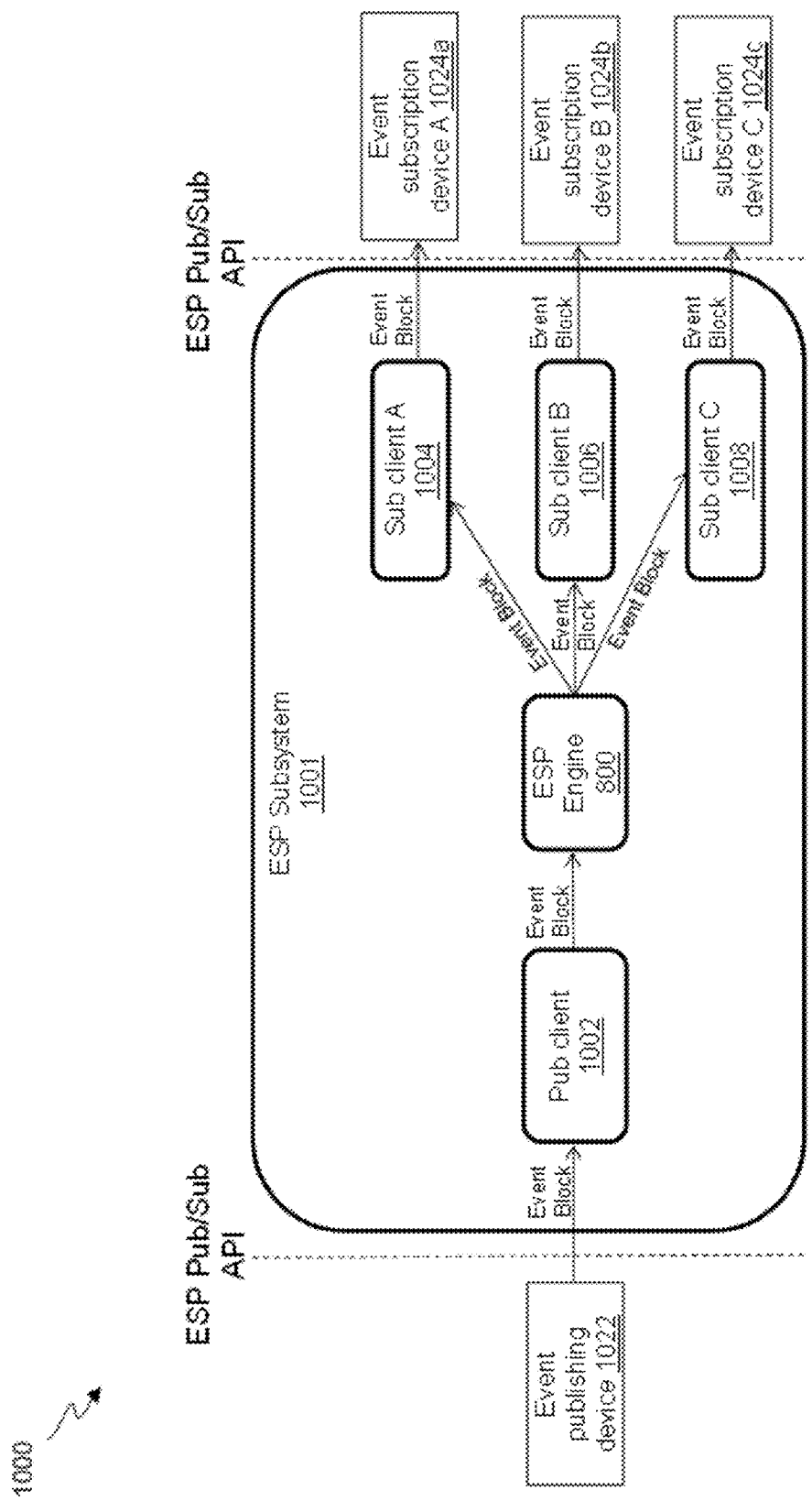
FIG. 10 is a block diagram of an ESP system interfacing between a publishing device and multiple event subscribing devices according to some aspects.

FIG. 10 is a block diagram of an ESP system 1000 interfacing between publishing device 1022 and event subscribing devices 1024*a-c* according to some aspects. ESP system 1000 may include ESP device or subsystem 1001, publishing device 1022, an event subscribing device A 1024*a*, an event subscribing device B 1024*b*, and an event subscribing device C 1024*c*. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the publishing device 1022.

ESPE 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some examples, big data is processed for an analytics project after the data is received and stored. In other examples, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the present disclosure provide technical solutions to technical problems, such as computing problems that arise when an ESP device fails which results in a complete service interruption and potentially significant data loss. The data loss can be catastrophic when the streamed data is supporting mission critical operations, such as those in support of an ongoing manufacturing or drilling operation. An example of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, one or more processors and one or more computer-readable mediums operably coupled to the one or more processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
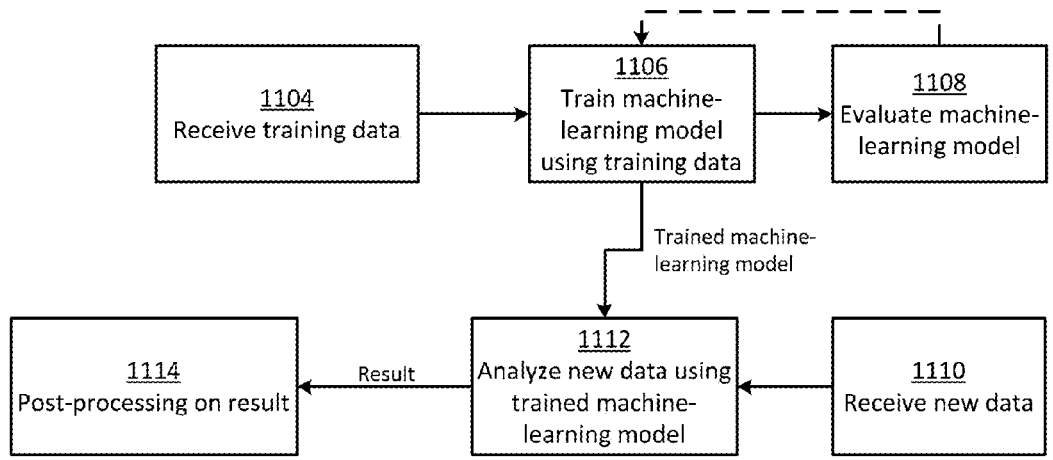
FIG. 11 is a flow chart of an example of a process for generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
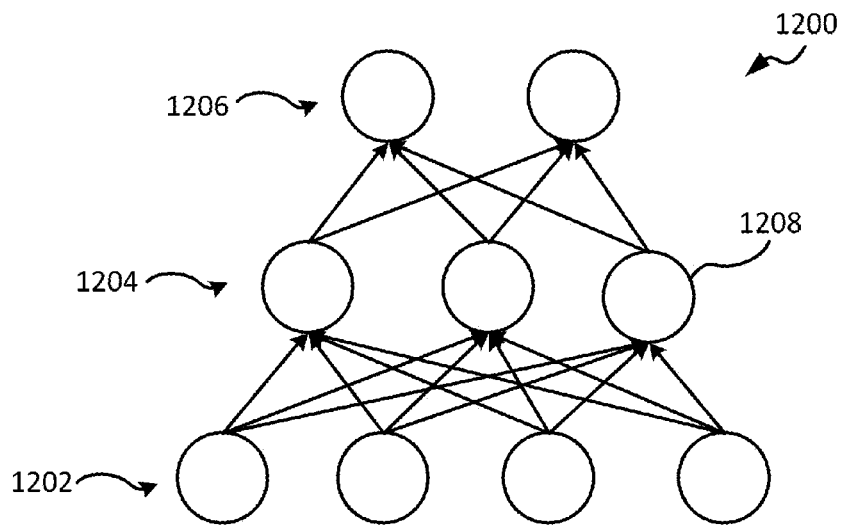
FIG. 12 is an example of a neural network according to some aspects.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y = \max(x, 0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Figure 13:
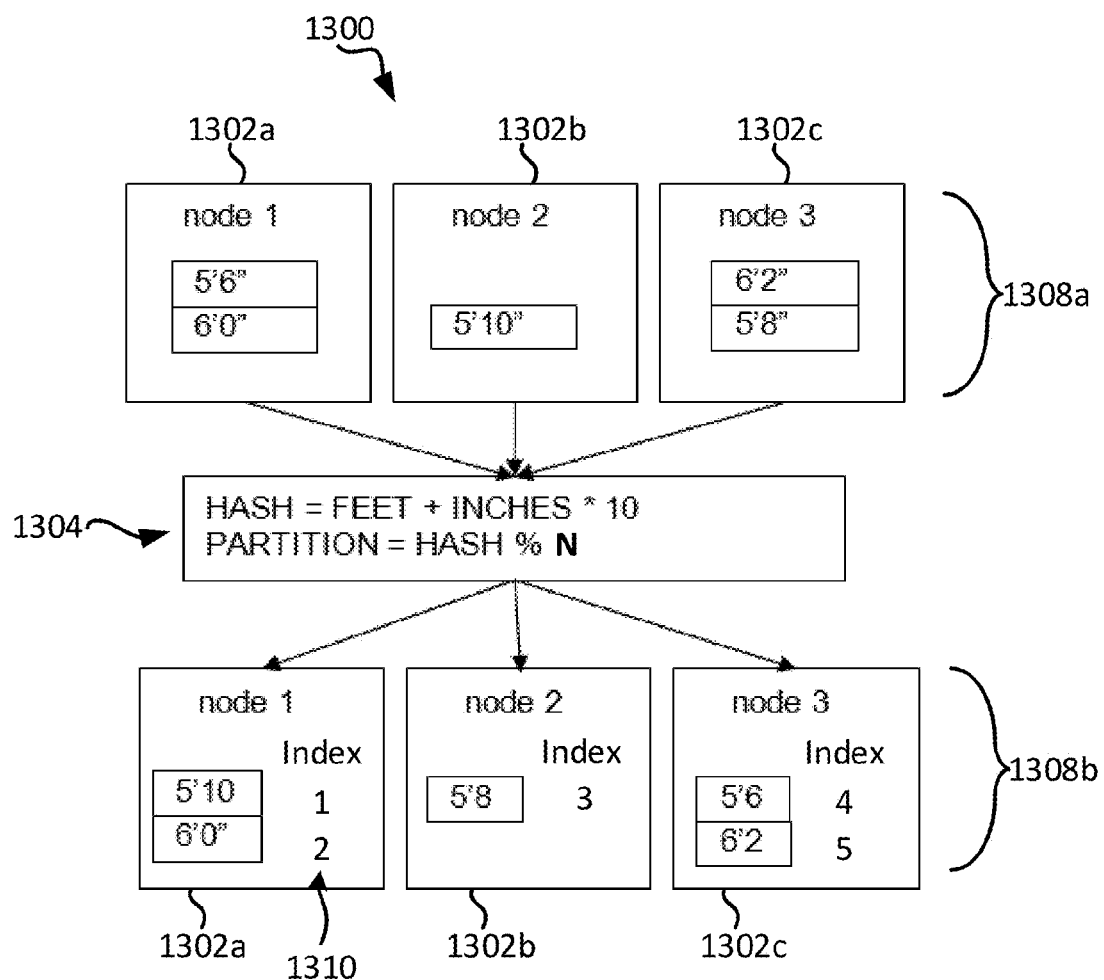
FIG. 13 is a block diagram of an example of a distributed computing environment for processing data according to some aspects.

FIG. 13 is a block diagram of an example of a distributed computing environment 1300 for processing data according to some aspects. The distributed computing environment 1300 includes multiple nodes 1302a-c across which a dataset is distributed. In this example, the dataset includes multiple keys corresponding to human height data. The value associated with each key is an implied count of 1. But in other examples the dataset may include full key-value pairs, or other types or formats of data.

The nodes 1302a-c are shown in two different states, a pre-shuffle state 1308a and a post-shuffle state 1308b. In the pre-shuffle state 1308a, the nodes 1302a-c can each have an initial portion of the dataset. For example, in the pre-shuffle state 1308a, node 1302a includes height data 5'6" and 6'0". The portions of the dataset stored on the nodes 1302a-c can then be reorganized or distributed in accordance with one or more shuffling schemes, such as the second algorithm in algorithms 1304, to create the post-shuffle state 1308b. In the post-shuffle state 1308b, the nodes 1302a-c may have different portions of the dataset. For example, in the post-shuffle state 1308b, node 1302a includes the height data 5'10" and 6'0".

The shuffling of the portions of the dataset among the nodes 1302a-c may be part of a map-shuffle-reduce process implemented by the nodes 1302a-c. A map-shuffle-reduce process can include three phases: a mapping phase, a shuffle phase, and a reduce phase. During the mapping phase, a node is in the pre-shuffle state 1308a and can have an initial portion of a dataset. The initial portion of the dataset may be hashed or unhashed. During the shuffling phase, the initial portion of the dataset stored on the node is distributed to a different node in the distributed computing environment 1300 according to a shuffling scheme. During the reducing phase, the node is in the post-shuffle state 1308*b* and can combine like pieces of data into a final result for the pieces of data.

As a particular example, the nodes 1302*a-c* can begin in a pre-shuffle state 1308*a* in which each node 1302*a-c* includes an initial set of height data that is represented as a combination of feet and inches. While in the pre-shuffle state 1308*a*, the nodes 1302*a-c* can implement a mapping phase of a map-shuffle-reduce process. During the mapping phase, the nodes 1302*a-c* can calculate hashes for height data according to the first algorithm in the algorithms 1304. For example, for the height data 5'6" that is stored on node 1302*a*, the node 1302*a* can multiply 6 inches by ten, and sum the result of 60 with the 5 feet to get a hash of 65. After determining hashes for the height data, the nodes 1302*a-c* can implement a shuffling phase. In the example shown in FIG. 13, the nodes 1302*a-c* implement the shuffling phase according to the second algorithm in the algorithms 1304, whereby a modulus of a hash value of a piece of height data is calculated with respect to a number of nodes N (in this example, three) in the distributed computing environment 1300 that are available for use. For example, the node 1302*a* can determine a modulus of the hash value of 65 with respect to the three nodes 1302*a-c* that are available for use in FIG. 13. This can result in a partition value of 2. The partition value can identify a node in the distributed computing environment to which to distribute the piece of height data. In this example, node 1302*a* is correlated with a partition value of zero, node 1302*b* is correlated with a partition value of 1, and node 1302*c* is correlated with a partition value of 2. But other correlations of partition values to nodes are possible. After determining the partition value for each the piece of height data, the piece of height data can then be distributed to the proper node—e.g., node 1302*c*. The nodes 1302*a-c* can repeat this process for some or all of the height data stored thereon, after which the nodes 1302*a-c* can be in the post-shuffle state 1308*b*.

The nodes 1302*a-c* can perform additional operations on the dataset when in the post-shuffle state 1308*b*. For example, the nodes 1302*a-c* can sort the locally stored portions of dataset, index the locally stored portion of the dataset, or both. For example, the nodes 1302*a-c* can assign index values 1310 to each height in the height data by traversing the nodes 1302*a-c* in a rank order. The rank order can be predesignated by a user or operator of the distributed computing environment 1300. In some examples, assigning a unique index value to each piece of data in the dataset can be referred to as levelization. Levelization can include enumerating all distinct values (or "levels") of a variable and assigning a unique index to each level from a range of [1, N], where N is the number of distinct values of the variable.

The nodes 1302*a-c* can also process the locally stored, indexed data in a particular order (e.g., an ascending or descending order) based on the index values 1310. For example, node 1302*a* can process the height data 5'10" first, and then 6'0" second. Node 1302*b* can process height data 5'8" third. Node 1302*c* can process the height data 5'6" fourth, and then height data 6'2" fifth. After the data stored on some or all of the nodes 1302*a-c* is processed, the distributed computing environment 1100 can output a final result.

The final result output by the distributed computing environment 1300 can be based on the order in which the data stored on the nodes 1302*a-c* is processed. But the order in which the data is processed is influenced by the number of nodes 1302*a-c* among which the data is distributed during the shuffling phase. This is because the shuffling algorithm (e.g., the second algorithm in algorithms 1304) uses a modulus of N, where N is the number of nodes in the distributed computing environment among which the data is to be distributed. If N changes (e.g., a new node is added or an existing node is removed), the data may be distributed differently among nodes in the distributed computing environment, thereby influencing the final result.

Figure 14:
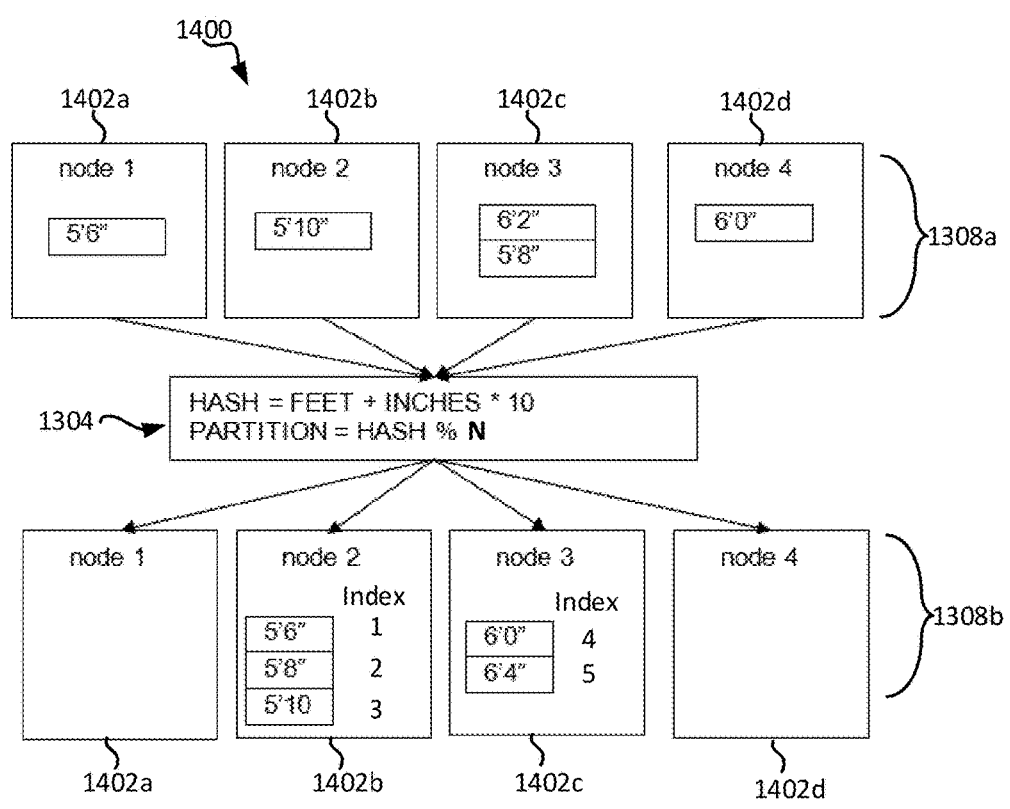
FIG. 14 is a block diagram of another example of a distributed computing environment for processing data according to some aspects.

As a particular example, in FIG. 14, the number of nodes 1402*a-d* in the distributed computing environment 1400 has changed from three to four. This changes the output of the second algorithm in the algorithms 1304, resulting in the data being distributed differently among the nodes 1402*a-d* in the post-shuffle state 1308*b*. Thus, even though the same algorithm is used (PARTITION=HASH % N) in FIGS. 13-14, the resulting distribution of data among the nodes 1402*a-d* is different. The different distribution of data among the nodes 1402*a-d* can lead to the final result from the distributed computing environment 1400 being different from the final result from the distributed computing environment 1300 in FIG. 13. The difference in final results can be referred to as unstable data-processing. Unstable data-processing negatively affects the reliability of the distributed computing environments 1300, 1400.

Figure 15:
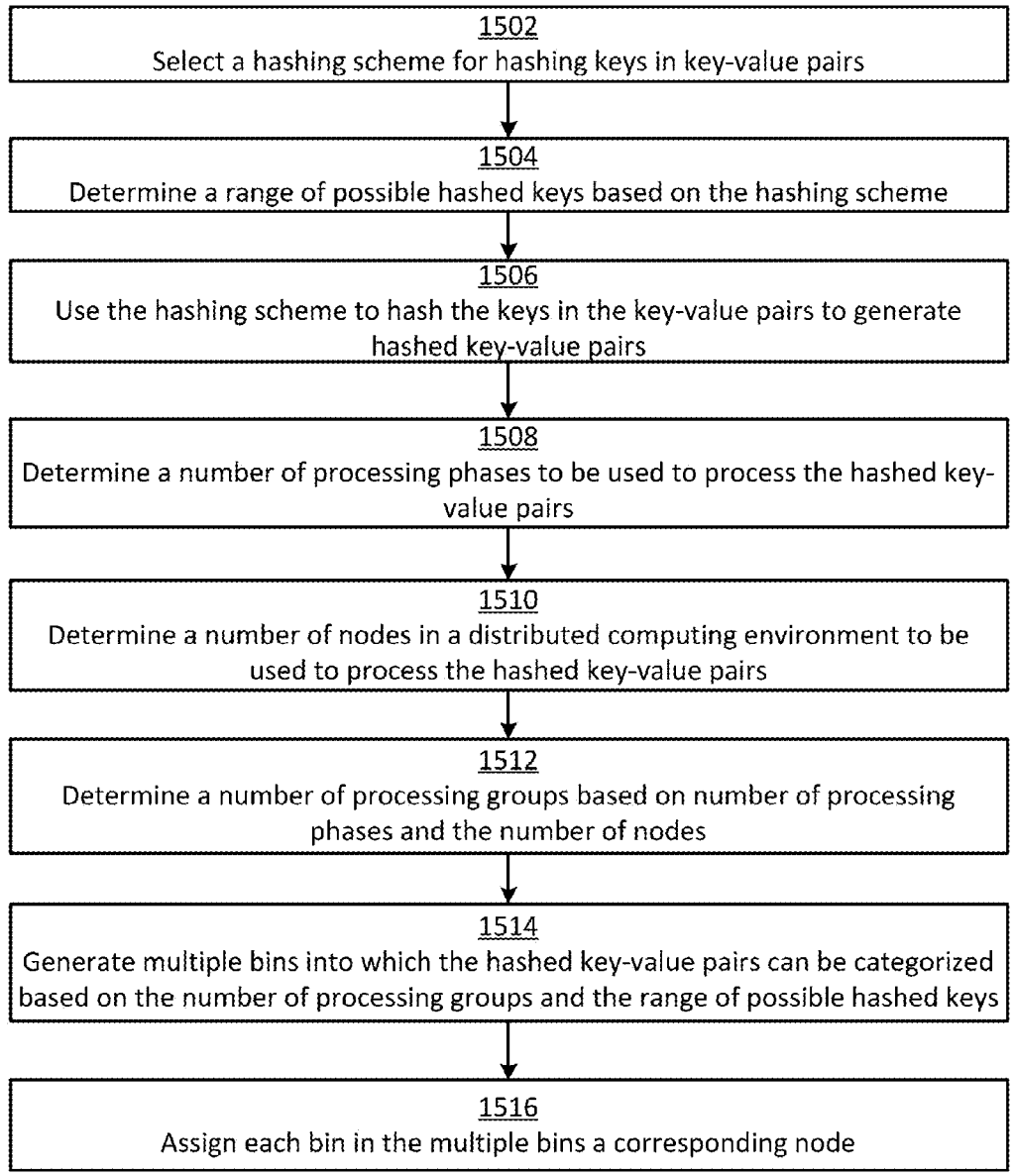
FIG. 15 is a flow chart of an example of a process for generating bins for categorizing key-value pairs according to some aspects.

Some examples of the present disclosure can overcome one or more of the abovementioned issues by at least partially implementing a process shown in FIG. 15. Other examples can include more steps, fewer steps, different steps, or a different order of the steps than depicted in FIG. 15. Some examples can be implemented using any of the systems and processes described with respect to FIGS. 1-12. The steps are described below with reference to key-value pairs, but any type of data may be used.

In block 1502, a processing device selects a hashing scheme for hashing keys in key-value pairs. The hashing scheme can be selected from among a group of possible hashing schemes stored in memory. Alternatively, the hashing scheme may be the only hashing scheme stored in memory.

In some examples, the hashing scheme includes an algorithm in which the keys are transformed into hashed keys using one or more mathematical operations. Any number and combination of hashing schemes can be selected, combined, or otherwise used as the hashing scheme.

In block 1504, the processing device determines a range of possible hashed keys based on the hashing scheme. For example, the hashing scheme can eliminate negative values such that a lower boundary of the range of possible hashed keys is zero. As another example, the processing device can determine the smallest possible hashed key and the largest possible hashed key, both of which collectively define boundaries of the range of possible hashed keys.

In some examples, the processing device determines the boundaries of range of possible hashed keys based on the type of data being processed. For example, it can be assumed that human heights will fall within the range of 0'0" and 10'11", because there is unlikely to be any humans taller than 10'11". So, the boundaries for the hashed keys in FIGS. 13-14 can be between 0 and 120 (HASH=10+11*10=120).

In block 1506, the processing device uses the hashing scheme to hash the keys in the key-value pairs to generate hashed key-value pairs.

In block 1508, the processing device determines a number of processing phases to be used to process the hashed key-value pairs. A processing phase can be a time interval during which a certain subset of data is to be processed. This is described in greater detail below with respect to FIG. 16.

In some examples, the number of processing phases can be input by a user. In other examples, the processing device determines the number of processing phases based on the amount of data to be processed and the amount of data that can be processed during each processing phase.

In block 1510, the processing device determines a number of nodes in a distributed computing environment to be used to process the hashed key-value pairs. In some examples, the processing device can determine the number of nodes by communicating with nodes in the distributed computing environment to determine which nodes are available to process the hashed key-value pairs. Additionally or alternatively, the processing device can determine the number of nodes based on the amount of data to be processed.

In block 1512, the processing device determines a number of processing groups based on a number of processing phases and the number of nodes. A processing group can be a group of data to be processed by a particular node, during a particular processing phase, in the distributed computing environment. In some examples, the processing device can determine the number of processing groups to be equal to, less than, or more than the number of nodes determined in block 1510.

In block 1514, the processing device generates multiple bins into which the hashed key-value pairs can be categorized based on the number of processing groups and the range of possible hashed keys. The number of bins can be greater than, less than, or equal to the number of processing groups.

The processing device can assign each of the bins a portion of the range of possible hashed keys. In some examples, the processing device can evenly divide range of possible hashed keys by the number of processing groups to determine the number of hashed keys to assign to each bin. For example, if there are 120 possible hashed keys and six processing groups, each bin can be assigned 120/6=20 hashed keys. In other examples, the processing devices can use percentile-based binning to achieve a balanced distribution of the hashed key-value pairs among the bins. Percentile-based binning can include designating the hashed-key ranges for the bins such that roughly the same percentage of hashed key-value pairs falls within each bin.

In block 1516, the processing device assigns each of the bins a corresponding node. In some examples, the processing device can determine an appropriate node for a bin using the equation:

Node=BIN % n+1 where n is a number of the nodes determined in block 1510. For example, if the bin number is 1 and there are 6 possible nodes, the processing device can calculate 1% 6+1 to determine that the appropriate node for bin 1 is Node 2.

Figure 16:
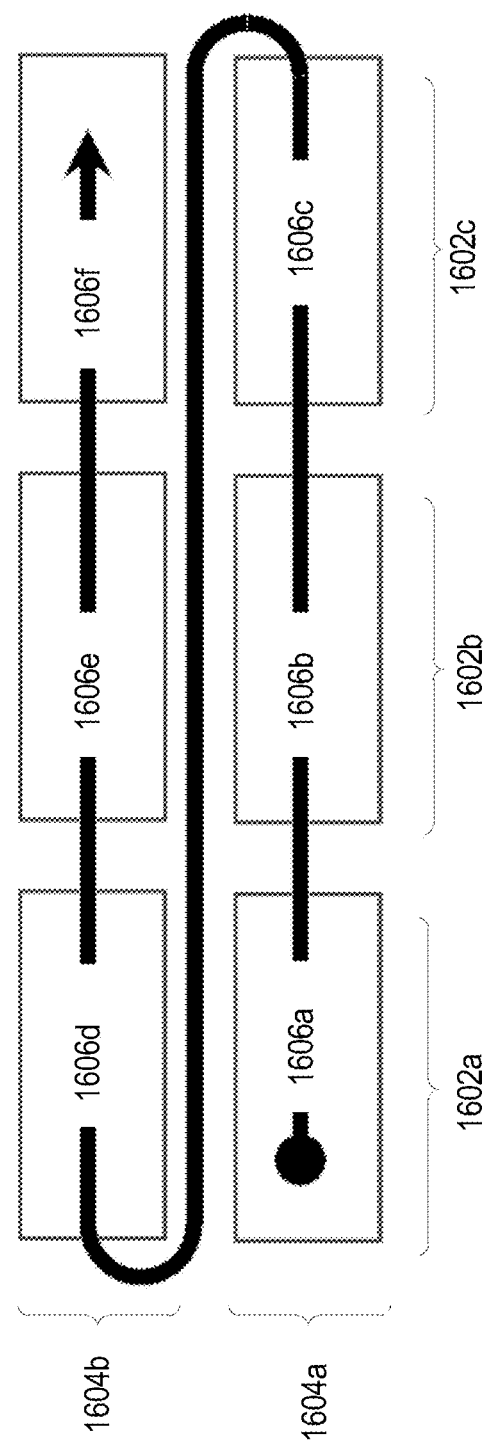
FIG. 16 is a block diagram of an example of bins mapped to nodes and phases according to some aspects.

In some examples, completing the steps of FIG. 15 can result in a mapping between bins, processing phases, nodes, or any combination of these. A block diagram of an example of such a mapping is shown in FIG. 16. As shown, a distributed computing environment can include multiple nodes 1602a-c. The nodes 1602a-c can include multiple bins 1606a-f split up among multiple processing phases 1604a-b. Data can be processed according to the nodes 1602a-c, bins 1606a-f, and processing phases 1604a-b. For example, in a first processing phase 1604a, data in bins 1606a-c can be processed. In a second processing phase 1604b, data in bins 1606d-f can be processed. In some examples, data can be processed according to an order indicated by the arrow shown in FIG. 16.

An example of a table 1700 depicting a mapping between bins, processing phases, and nodes is shown in FIG. 17. Table 1700 includes column 1702 that lists bins. In this example, there are five bins labeled 0-5. Columns 1704-1706 list the lower boundary and upper boundary, respectively, for a range of hashed keys associated with each bin. Column 1708 lists the ending nodes corresponding to each of the bins. In this example, there are three possible ending nodes (labeled 1, 2, and 3) associated with bins 0-5. Column 1710 lists the processing phases corresponding to the bins. In this example, there are two possible processing phases (labeled 1 and 2) associated with the bins.

The mapping between bins, processing phases, nodes, or any combination of these can be used to determine how to distribute data among the nodes during a shuffling phase of a map-shuffle-reduce process. For example, while in a pre-shuffle state, a node may receive data and determine a hashed version of the data. The hashed version of the data can fall within a hash range associated with a particular bin, such as bin 2 in table 1700. The node can determine the particular bin using the table or another data structure that includes the mapping. The node can then determine a destination node that corresponds to the particular bin and to which the data (or the hashed version of the data) is to be distributed. The node can transmit the data (or the hashed version of the data) to the destination node, which can receive and stored the data (or the hashed version of the data).

Figure 18:
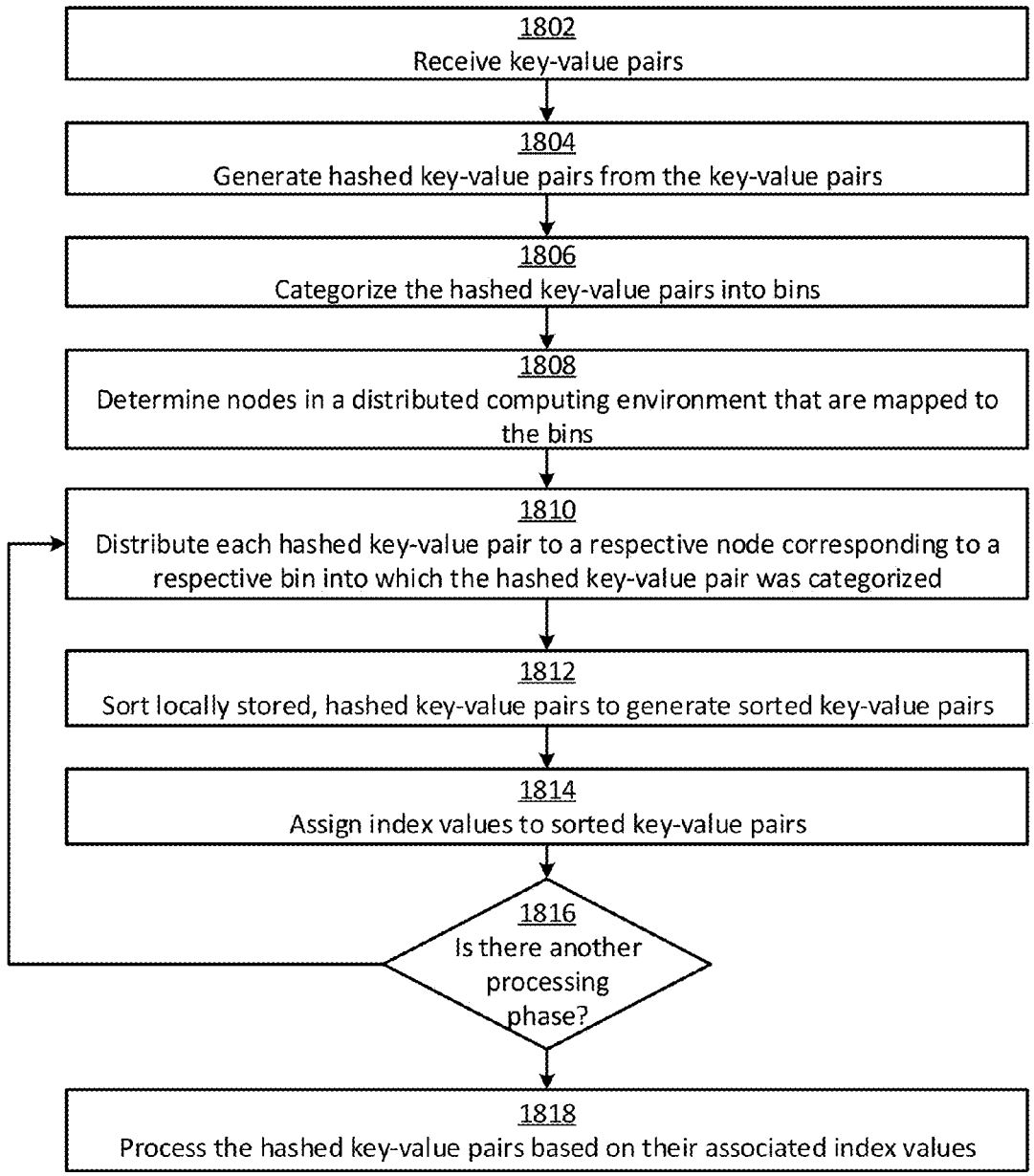
FIG. 18 is a flow chart of an example of a process for stable data processing in a distributed computing environment processing.

One example of a process for using the mapping between bins, processing phases, nodes, or any combination of these to determine how to distribute data among the nodes is shown in FIG. 18. Some examples can include more steps, fewer steps, different steps, or a different order of the steps than depicted in FIG. 18. Some examples can be implemented using any of the systems and processes described with respect to FIGS. 1-12. The steps are described below with reference to key-value pairs, but any type of data may be used.

In block 1802, a processing device receives key-value pairs. In some examples, the processing device can retrieve the key-value pairs from a remote database or a local database. In additional or alternative examples, the processing device can receive communications, from remote computing devices, that include the key-value pairs.

Figure 19:
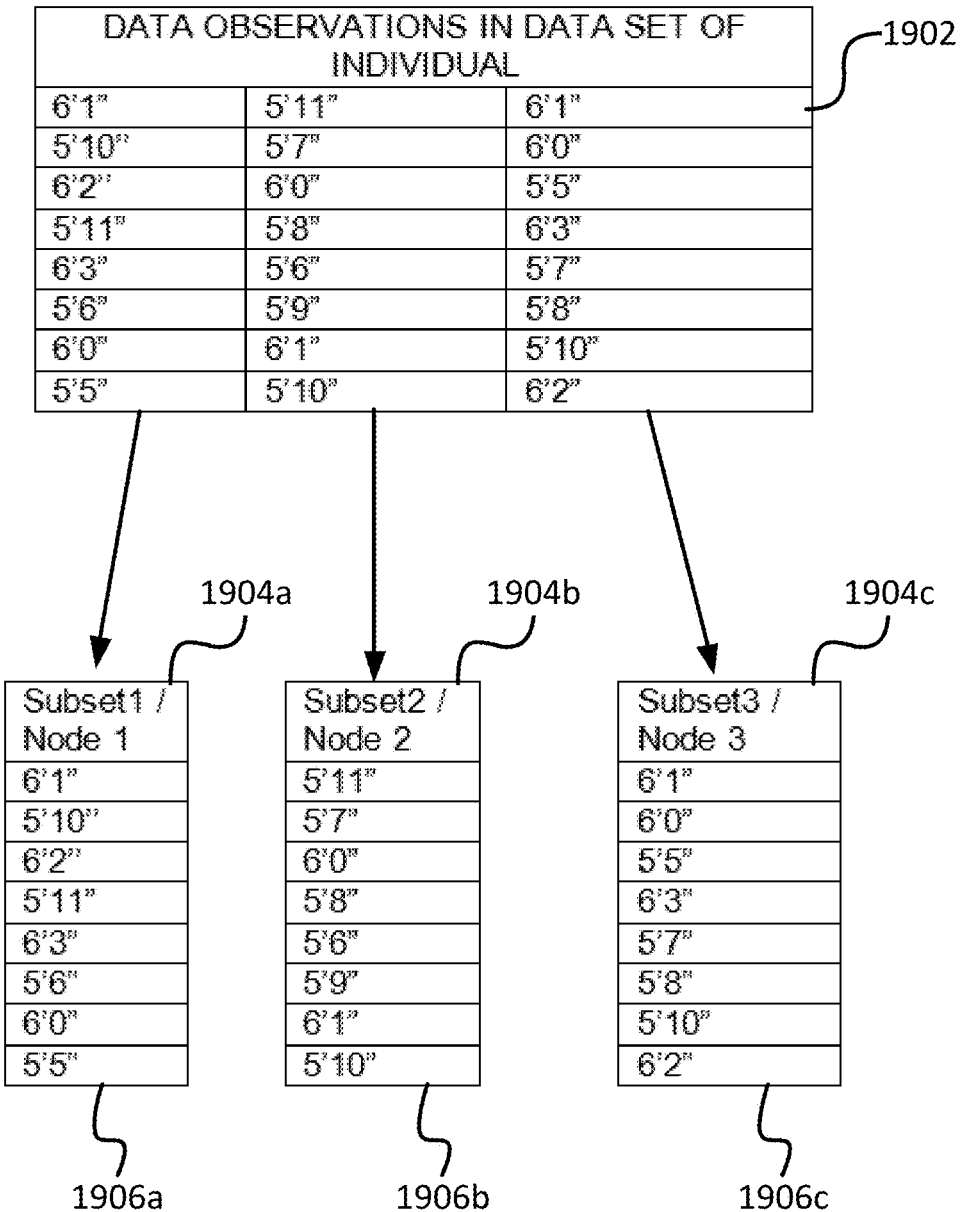
FIG. 19 is a block diagram of an example of a data set being distributed to nodes of a distributed computing environment according to some aspects.

The processing device can be one of multiple processing devices in multiple nodes that collectively receive the key-value pairs. For example, FIG. 19 depicts a dataset 1902. The dataset 1602 is initially distributed among nodes 1904a-c. In this example, dataset 1902 includes height data that is divided into three subsets of data 1906a-c and distributed among the nodes 1904a-c in a pre-shuffle phase.

Returning to FIG. 18, in block 1804, the processing device generates hashed key-value pairs from the key-value pairs. In some examples, the processing device can perform this step similarly to block 1506 of FIG. 15.

In block 1806, the processing device categorizes the hashed key-value pairs into bins. In some examples, the processing device categorizes the hashed key-value pairs into the bins using a look-up table, such as table 1700 of FIG. 17, or another data structure. Each hashed key-value pairs can be categorized into a bin that spans a range of hashed keys that includes the respective hashed key.

In block 1808, the processing device determines the nodes in the distributed computing environment that are mapped to the bins. In some examples, the processing device can determine the nodes using a look-up table or other data structure.

After block 1808, the processing device may have determined, for each key-value pair, a corresponding hash value, node, processing phase, or any combination of these. For example, FIG. 20 shows mappings between the subsets of data 1906*a-c* from FIG. 19 and corresponding hash values 2004, nodes 2006, and processing phases 2008. In this example, the hash values 2004 were determined using the same hashing scheme described with respect to FIGS. 13-14 (HASH=FEET+INCHES*10). But other hashing schemes can alternatively be used.

In block 1810, the processing device distributes each hashed key-value pair to the node corresponding to the bin into which the hashed key-value pair was categorized. Distributing the hashed-key value pairs can include maintaining a key-value pair in memory, transmitting a key-value pair to another node, deleting the key value pair that was transmitted to the other node from memory, or any combination of these.

Figure 21:
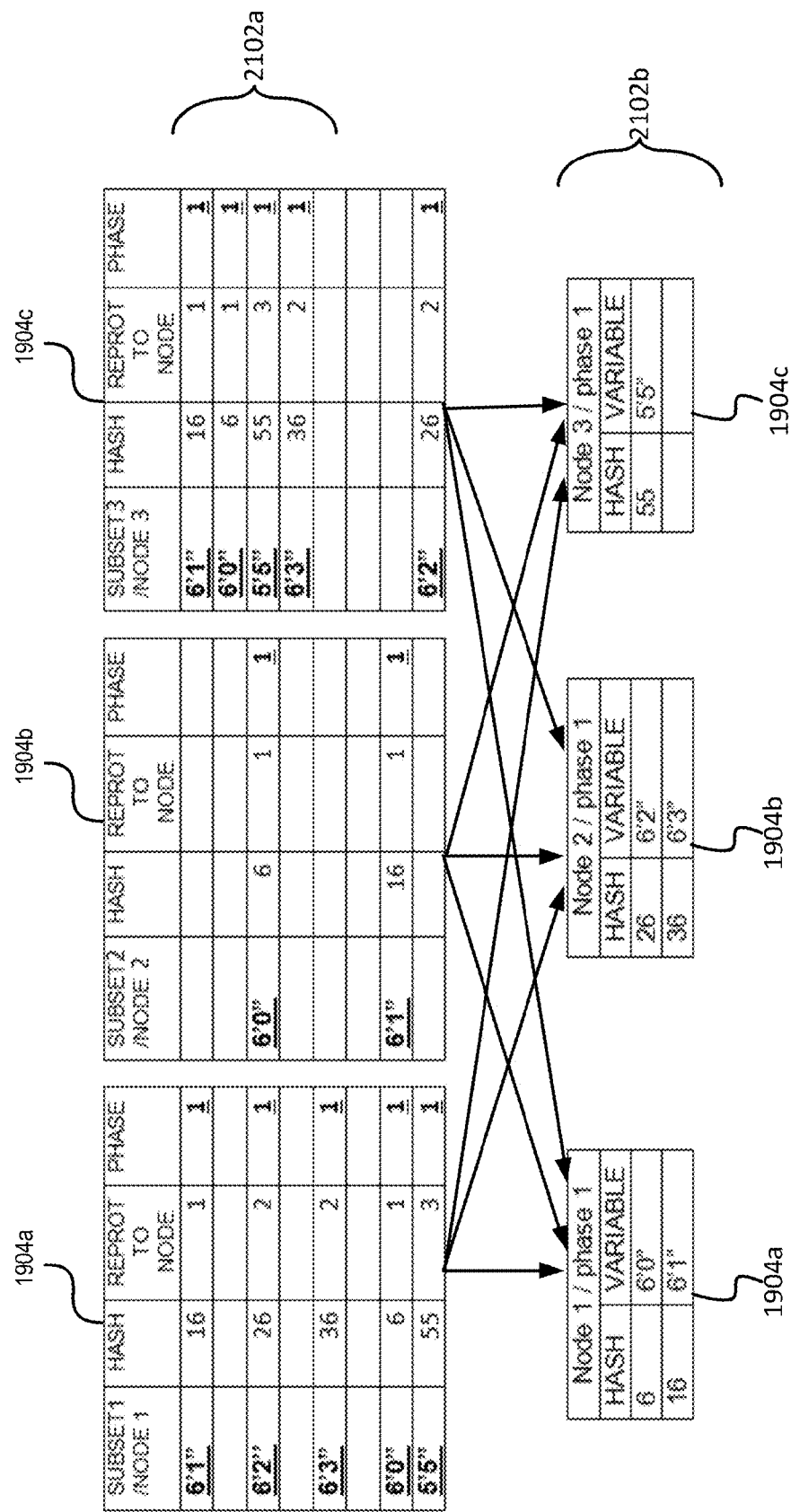
FIG. 21 is a block diagram of an example of the first processing-phase data from FIG. 20 being distributed to nodes in the distributed computing environment according to some aspects.

In some examples, the processing device can distribute a group of hashed key-value pairs during a processing phase. For example, FIG. 21 shows nodes 1904*a-c* during a pre-shuffle state 2102*a* and a post-shuffle state 2102*b*. The hashed key-value pairs are distributed, during processing phase 1, to their corresponding destination nodes 1904*a-c*, while the hashed key-value pairs associated with processing phase 2 remain in place.

Figure 22:
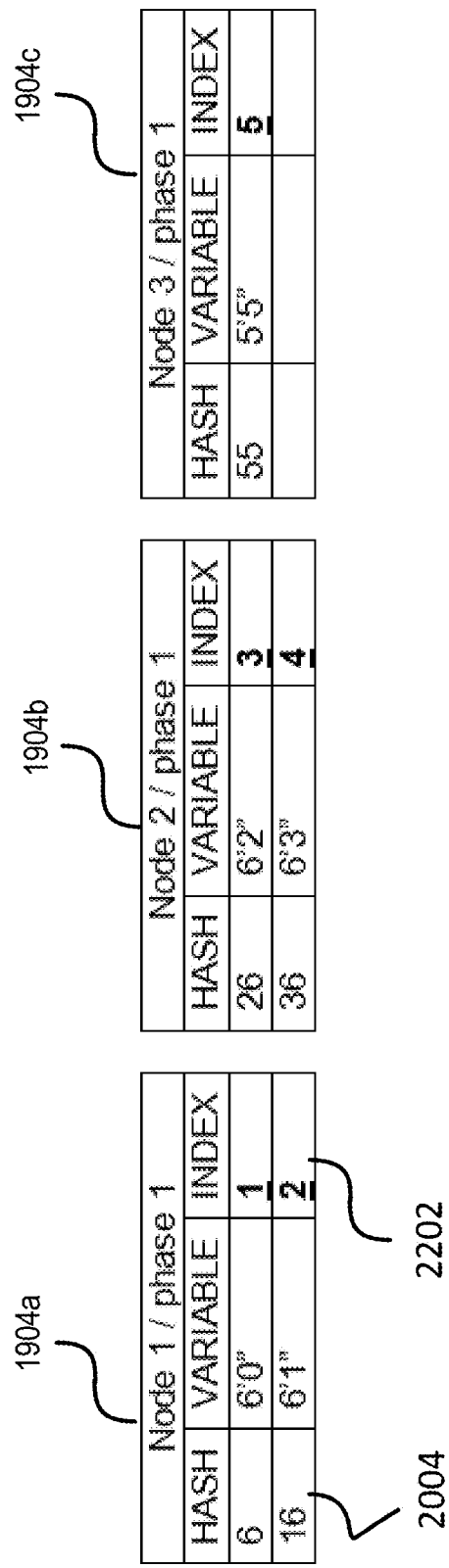
FIG. 22 is set of tables showing an example of the distributed data from FIG. 21 sorted and with assigned index values according to some aspects.

In block 1812, the processing device sorts the locally stored, hashed key-value pairs to generate sorted key-value pairs. The processing device can sort the hashed key-value pairs by key, by value, by hash, or by any combination of these. The processing device can use any sorting technique. For example, in FIG. 22, the key-value pairs are locally sorted in ascending order based on their hash 2004. In other examples, the key-value pairs can be locally sorted in descending order based on their hash or another value. In some examples, if two hashed keys are the same, the key-value pairs may be further sorted by keys.

In block 1814, the processing device assigns index values to the sorted key-value pairs. In some examples, the processing device can assign the index values to the sorted key-value pairs in an ascending order, by rank of the nodes, or both of these. For example, in FIG. 22, the sorted key-value pairs that are locally stored in nodes 1904*a-c* are assigned index values 1-5.

Figure 23:
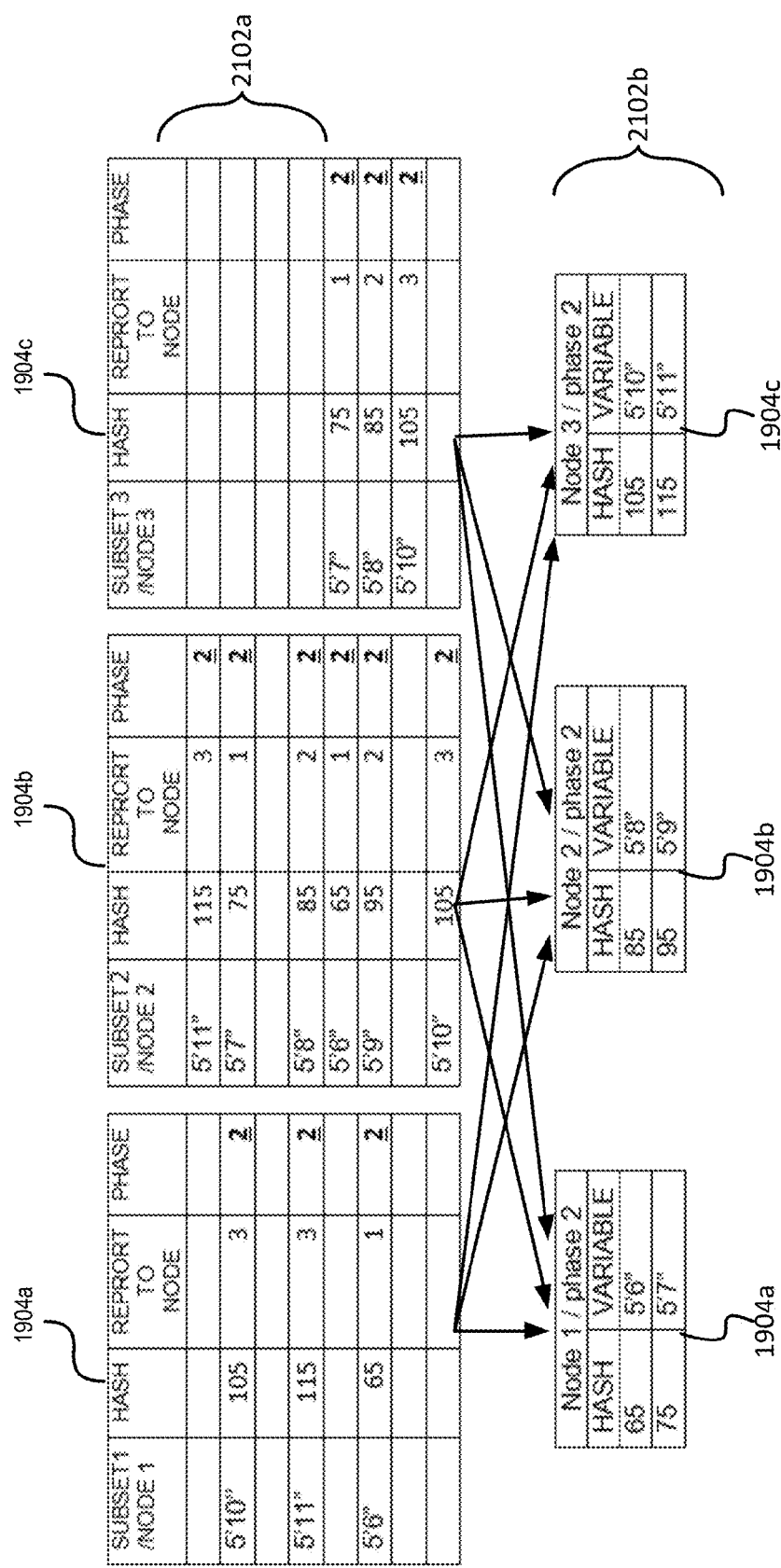
FIG. 23 is a block diagram of an example of the second processing-phase data from FIG. 20 being distributed to nodes in the distributed computing environment according to some aspects.
Figure 24:
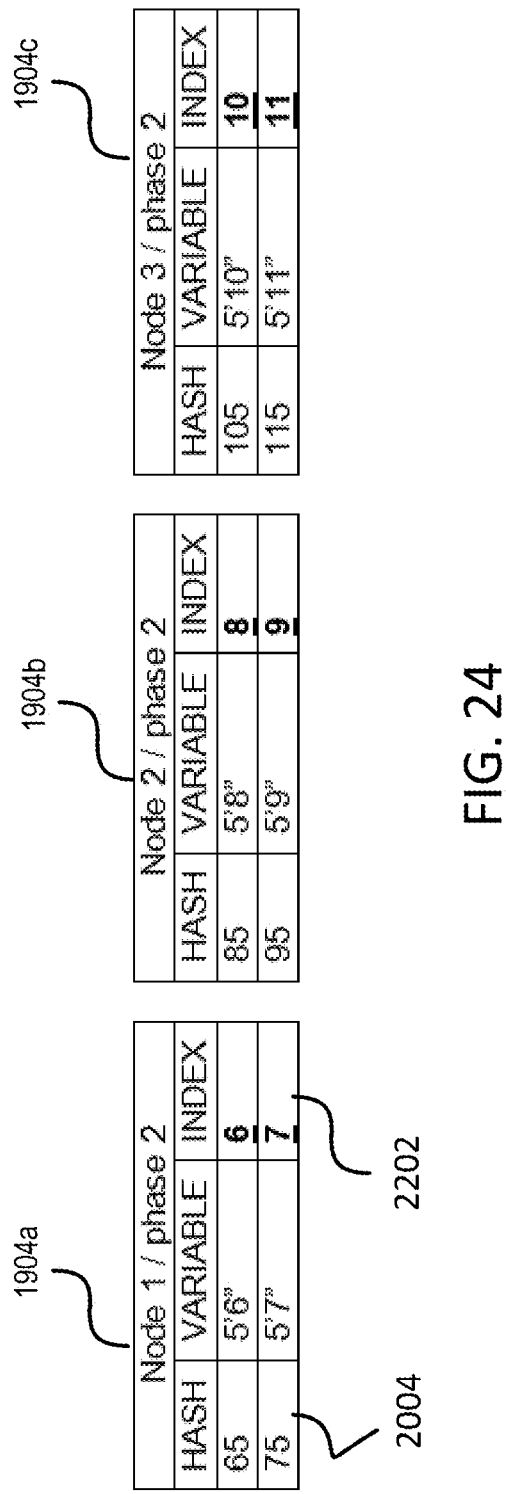
FIG. 24 is a set of tables showing an example of the distributed data from FIG. 23 sorted and with assigned index values according to some aspects.

In block 1816, the processing device determines if there is another processing phase. If so, the processing device can return to block 1810 and repeat steps 1810-1816. For example, the data shown in FIG. 20 is split up among two processing phases. FIGS. 23-24 can depict the data associated with the second processing phase being distributed, sorted, and indexed according to steps 1810-1814. If the processing device determines that there is not another processing phase, the process can proceed to block 1818.

Figure 25:
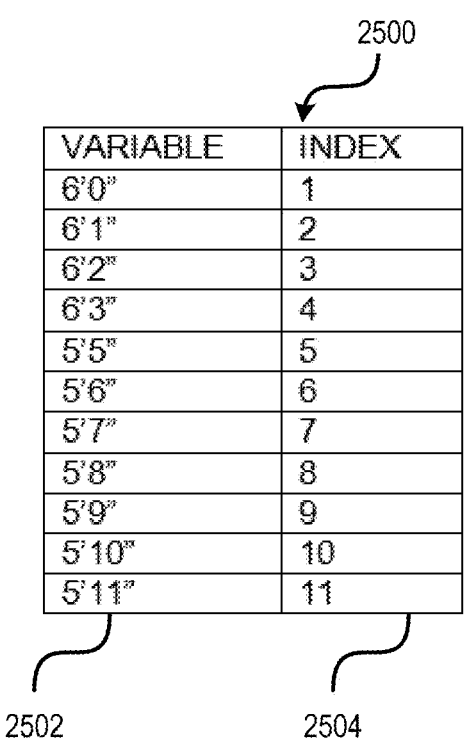
FIG. 25 is a table showing an example of the sorted data and index values in FIGS. 21 and 23 according to some aspects.

In block 1818, the processing device processes the hashed key-value pairs based on their associated index values. In some examples, the processing device removes duplicates of hashed key-value pairs, determines an ordered list of the hashed key-value pairs, or both of these. An example of an ordered list is shown in table 2500 of FIG. 25, in which the data 2502 is ordered by index value 2504. In some examples, the processing device can further process the hashed key-value pairs based on the order of the hashed key-value pairs in the ordered list. For example, the processing device can sample subsets of, or analyze, the ordered list of hashed key-value pairs to determine a trend, spike or peak, or other feature corresponding to the hashed key-value pairs.

The processes discussed above with respect to FIGS. 14-24 can result in stable data-processing, in which the output from a distributed computing environment is consistent for the same set of input key-value pairs, regardless of the number of nodes in the distributed computing environment.

Figure 26:
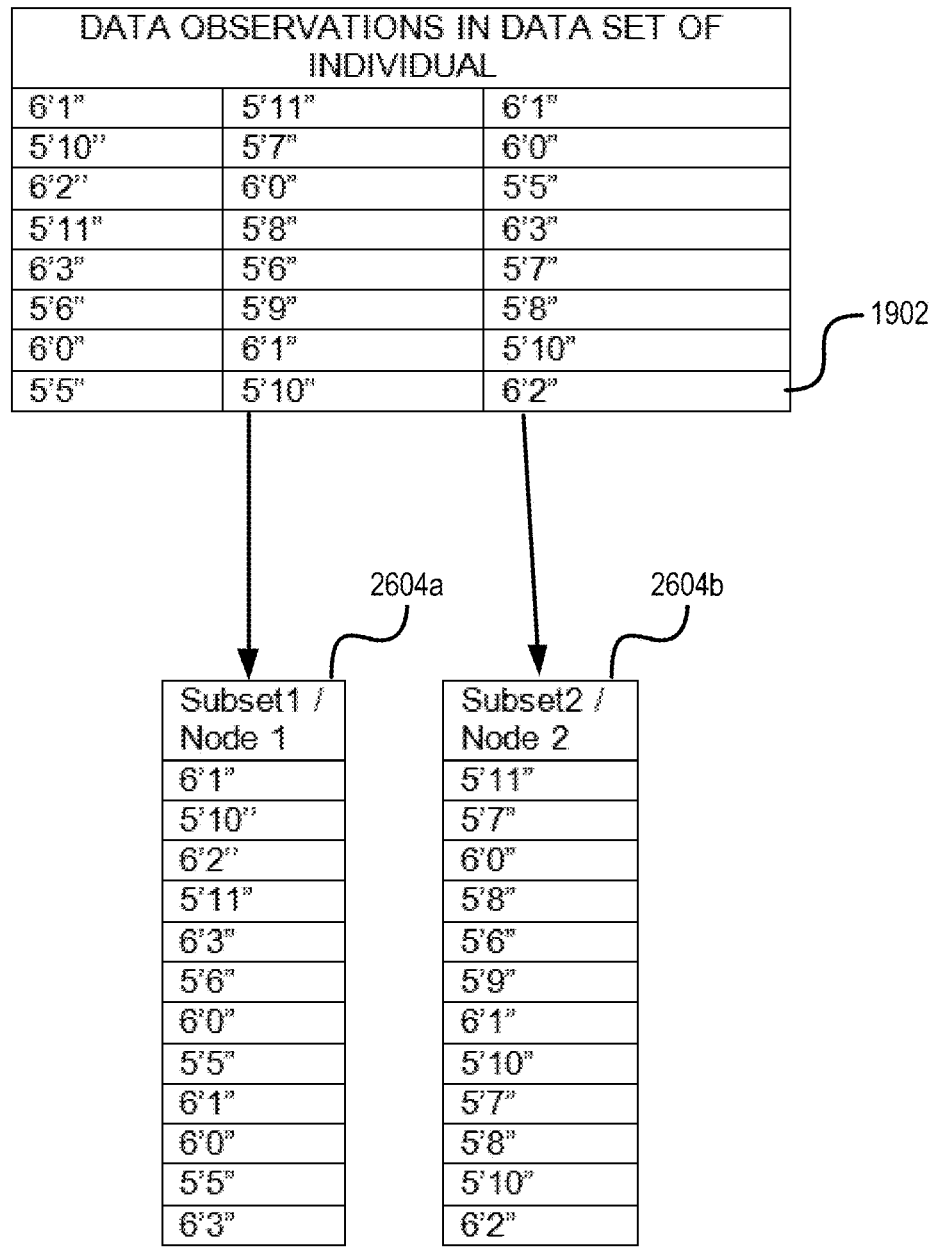
FIG. 26 is a block diagram of another example of the data set in FIG. 19 distributed to nodes of a distributed computing environment according to some aspects.
Figure 27:
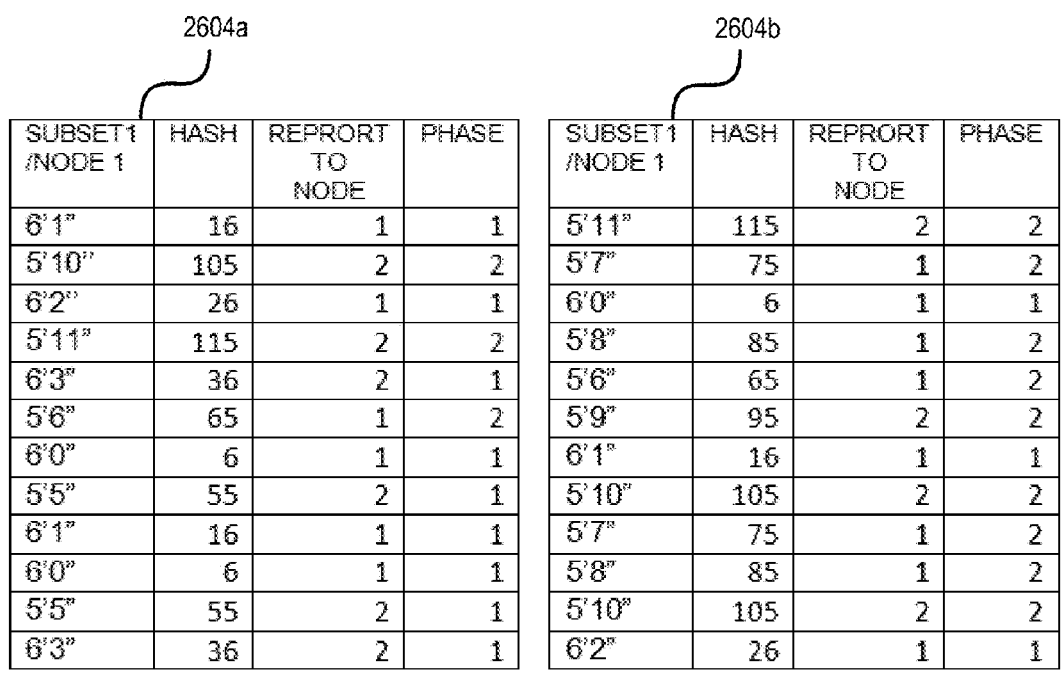
FIG. 27 is a set of tables showing an example of the distributed data in FIG. 26 with hash values according to some aspects.
Figure 28:
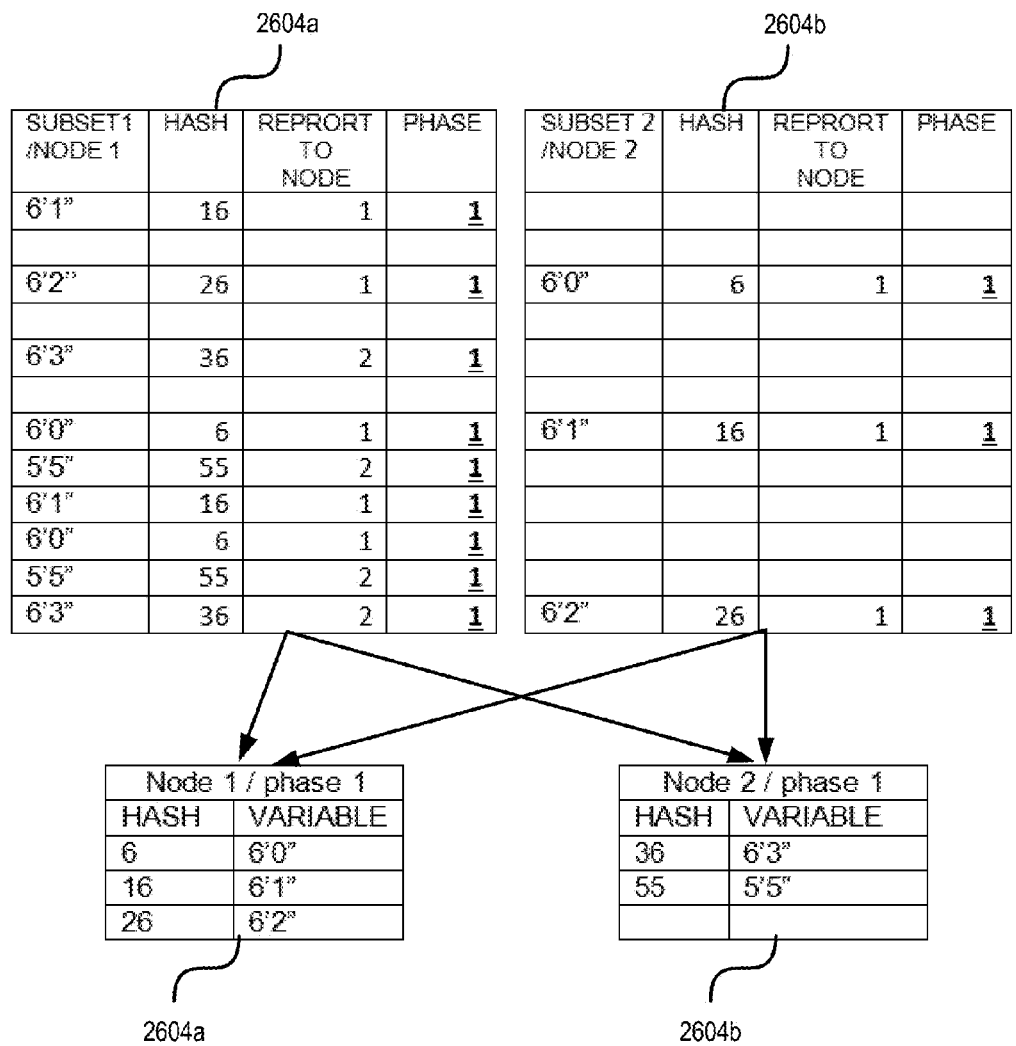
FIG. 28 is a block diagram of an example of the first processing-phase data in FIG. 26 being distributed to nodes in the distributed computing environment according to some aspects.
Figure 29:
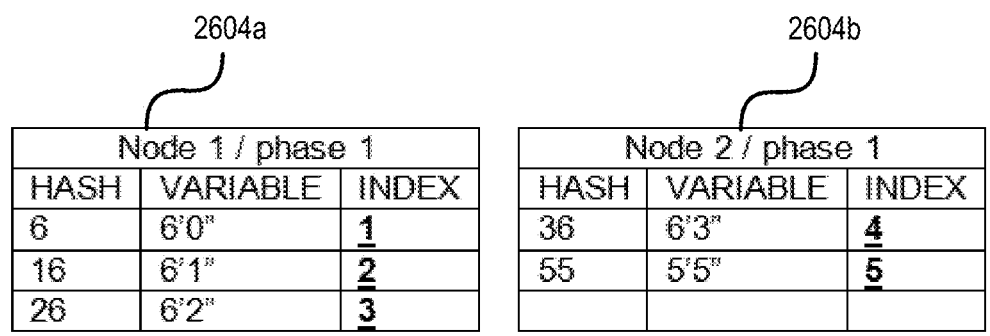
FIG. 29 is set of tables showing examples of the distributed data from FIG. 28 sorted and with assigned index values according to some aspects.
Figure 30:
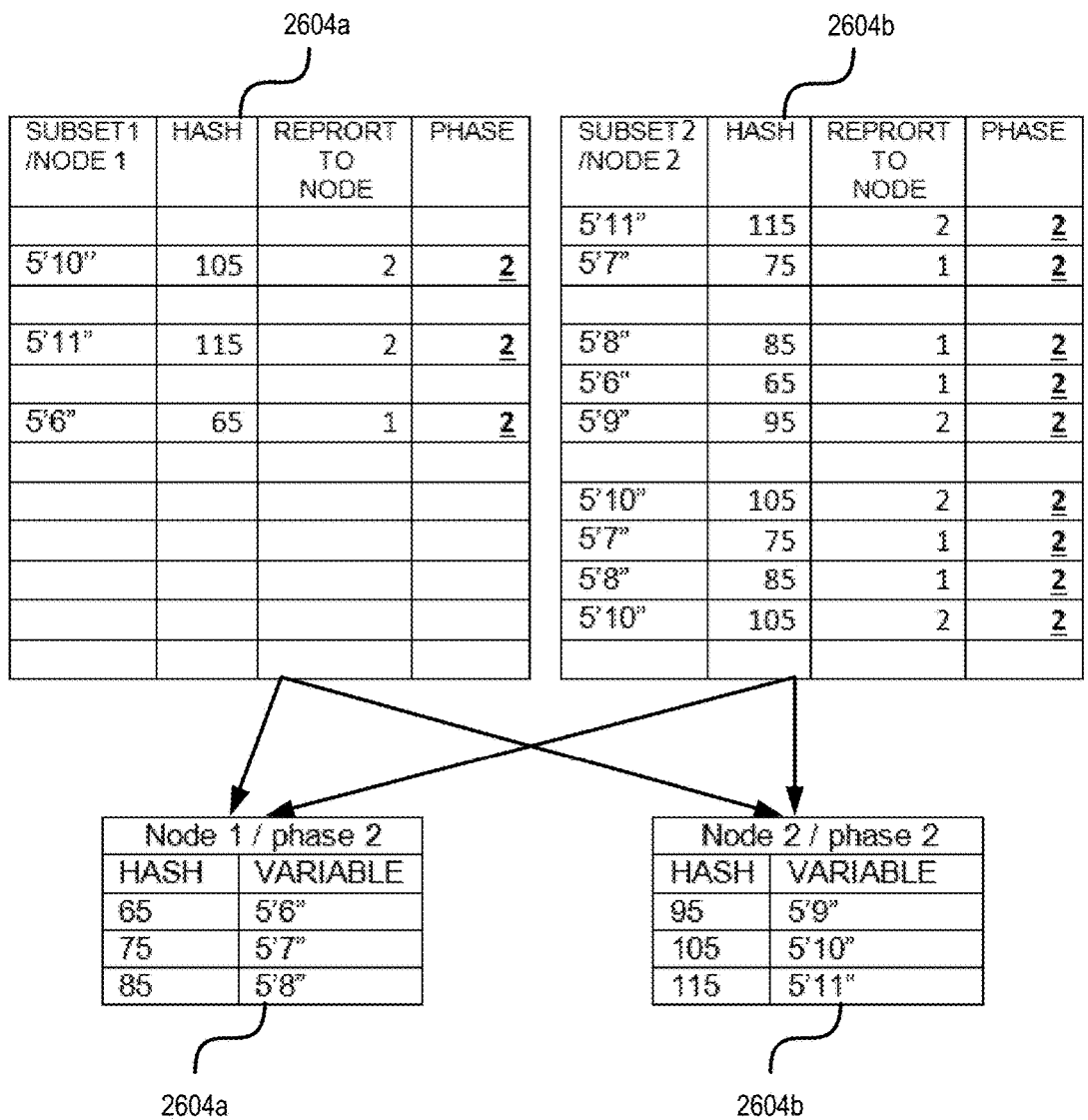
FIG. 30 is a block diagram of an example of the second processing-phase data in FIG. 27 being distributed to nodes in the distributed computing environment according to some aspects.
Figure 31:
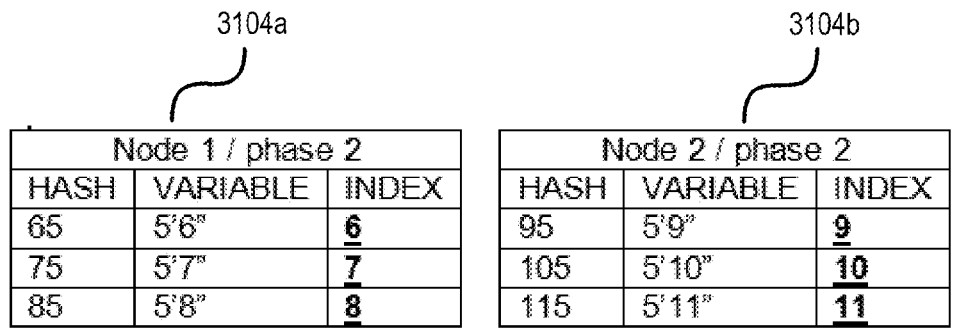
FIG. 31 is a set of tables showing an example of the distributed data from FIG. 30 sorted and with assigned index values according to some aspects.
Figure 32:
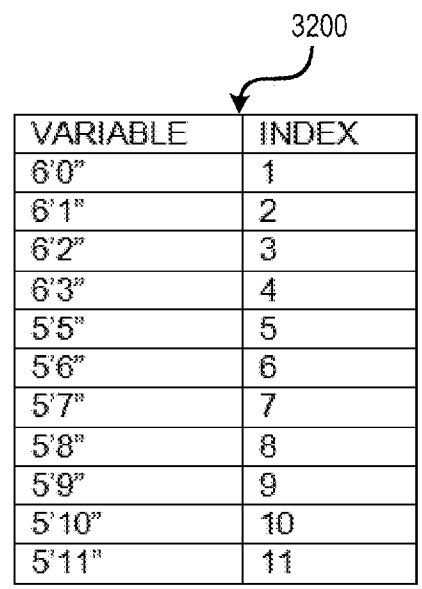
FIG. 32 is a table showing an example of the sorted data and index values in FIGS. 29 and 31 according to some aspects.

For example, FIG. 26 depicts the same dataset 1902 of FIG. 19 being distributed across two nodes 2604*a-b*. At this point, the nodes 2604*a-b* can be in a pre-shuffle state. The same hashing scheme described above in regards to FIGS. 13-14 and 20 was used to determine corresponding hashes, which are shown in FIG. 27. Since the hashing scheme is unaffected by the number of ending nodes, the hashes in FIG. 27 remained the same as in FIG. 20. Then, nodes and processing phases corresponding to the dataset 1902 were determined. The nodes and processing phases assigned to the dataset 1902 in FIG. 27 are different from the nodes and processing phases assigned to the dataset 1902 in FIG. 19, since the number of nodes to which data can be distributed is different. After determining the nodes and processing phases, a first portion of the dataset is distributed during a first processing phase, as shown in FIG. 28, and then indexed, as shown in FIG. 29. A second portion of the dataset is distributed during a second processing phase, as shown in FIG. 30, and then indexed, as shown in nodes 3104*a-b* of FIG. 31. This can result in the ordered list of data shown in table 3200 of FIG. 32. This ordered list can be the same as the ordered list of data shown in table 2500 of FIG. 25. Since the same input data produces the same ordered list of data, regardless of a change in the number of nodes in the distributed computing environment, the distributed computing environment(s) illustrated by FIGS. 19-32 can be referred to as stable.

Figure 33:
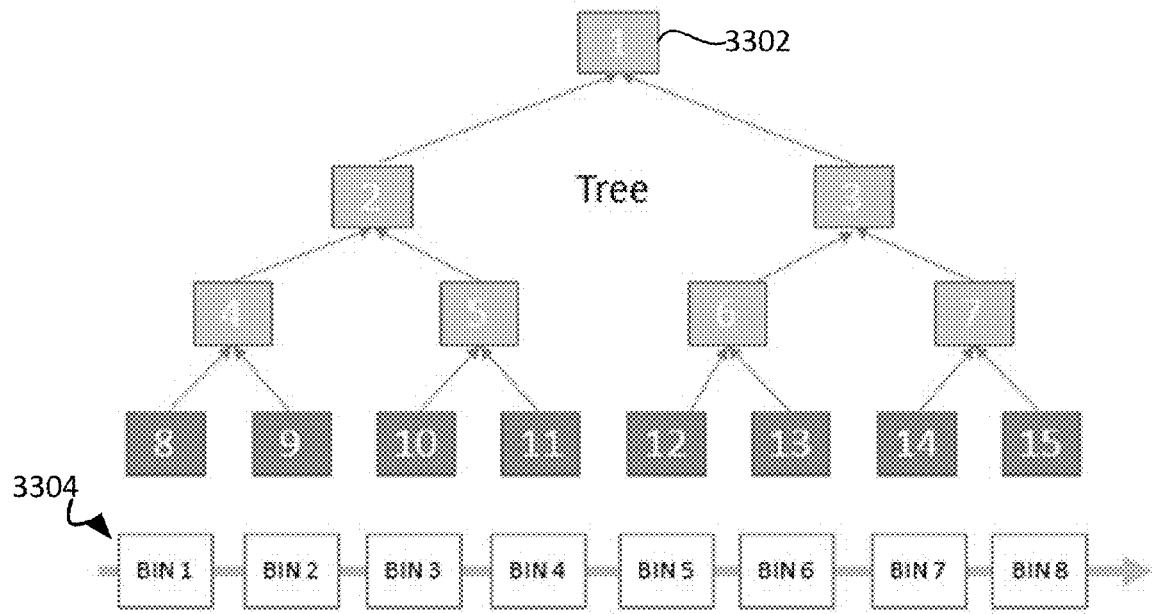
FIG. 33 is a block diagram of an example of a distributed computing environment with nodes arranged in a tree structure according to some aspects.

FIG. 33 is a block diagram of an example of a distributed computing environment with nodes, such as node 3302, arranged in a tree structure according to some aspects. In the tree structure, the arrows can refer to a direction and order of data processing. There are 15 nodes in the tree structure of this example, but the tree structure can have any number and arrangement of nodes. And other distributed computing environments can have other arrangements of the nodes.

In some examples, the number of processing groups (e.g., from block 1512 of FIG. 15) used in stable data-processing can be less than the total number of nodes in the tree structure. For example, only the bottom eight nodes, which can be referred to as leaf nodes, in the tree structure may be used as ending nodes for performing stable data-processing. And there may be only be as many bins 3304 as there are leaf nodes. For example, there may only be eight bins, each of which is assigned to a particular leaf node.

In other examples, the leaf nodes of the tree structure can complete a first pass through all the key-value pairs, followed by the inner nodes of the tree structure further reducing the results produced by the leaf nodes. This process can be repeated until all of the nodes have performed passes on the key-value pairs.

Figure 34:
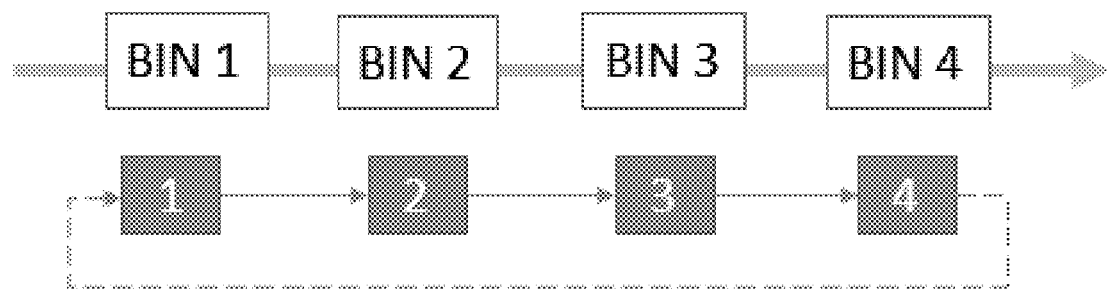
FIG. 34 is a block diagram of an example of a distributed computing environment with nodes arranged in a ring structure according to some aspects.

FIG. 34 is a block diagram of an example of a distributed computing environment with nodes arranged in a ring structure according to some aspects. In the ring, the arrows can refer to the order and direction of data processing. The nodes in this example are numbered 1-4, but the distributed computing environment can include any number of nodes. There can be a bin (such as bins 1-4) corresponding to each of the nodes. Key-value pairs can be processed in order from the first node to the last node in the ring. This process can be repeated (e.g., in a round-robin fashion).

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A method for distributing data among nodes in a distributed computing environment to provide for stable data processing, the method comprising:
   generating, by a node of the distributed computing environment, a plurality of key-value pairs as part of a job, each key-value pair of the plurality of key-value pairs having a respective hashed key and a corresponding value; and
   performing, by the node, the job at least in part by organizing the plurality of key-value pairs among a set of nodes in the distributed computing environment using an organizational process that includes:
      categorizing the plurality of key-value pairs into a plurality of bins, each key-value pair of the plurality of key-value pairs being categorized into a bin of the plurality of bins spanning a range of hashed keys that includes the respective hashed key;
      determining that the set of nodes in the distributed computing environment are mapped to the plurality of bins, each bin of the plurality of bins being mapped to a single node of the set of nodes;
      distributing each respective key-value pair in the plurality of key-value pairs to a respective node corresponding to a respective bin into which the respective key-value pair is categorized;
      sorting a subset of the plurality of key-value pairs maintained on the node by at least one of hashed key or key to generate sorted key-value pairs; and
      assigning index values to the sorted key-value pairs in an ascending order or a descending order and based on a predetermined rank of the node among the set of nodes to generate a set of indexed key-value pairs, the set of indexed key-value pairs being usable to determine a result of the job.

2. The method of claim 1, further comprising generating the plurality of key-value pairs by:
   receiving a plurality of unhashed key-value pairs having keys and values; and
   hashing the keys in the plurality of unhashed key-value pairs using a hashing scheme to form the plurality of key-value pairs.

3. The method of claim 2, further comprising determining a range of possible hashed keys based on the hashing scheme, the range of possible hashed keys spanning from a lowest possible hashed key that is createable using the hashing scheme to a highest possible hashed key that is createable using the hashing scheme.

4. The method of claim 3, further comprising determining a number of processing groups by:
   identifying a group of nodes in the distributed computing environment to be used to process the plurality of key-value pairs;
   determining a number of nodes in the group of nodes;
   identifying a plurality of processing phases to be executed to process the plurality of key-value pairs;
   determining a number of processing phases in the plurality of processing phases; and
   multiplying the number of nodes by the number of processing phases to determine the number of processing groups.

5. The method of claim 4, further comprising determining the plurality of bins by:
   dividing the range of possible hashed keys by the number of processing groups to generate the plurality of bins, each bin in the plurality of bins spanning a portion of the range of possible hashed keys and being mapped to (i) a particular node in the group of nodes and (ii) a particular processing phase of the plurality of processing phases.

6. The method of claim 5, wherein distributing each respective key-value pair in the plurality of key-value pairs to the respective node corresponding to the respective bin into which the respective key-value pair is categorized comprises:
   executing the plurality of processing phases by, for each processing phase of the plurality of processing phases:
      identifying one or more bins of the plurality of bins mapped to the processing phase;
      identifying one or more nodes in the group of nodes mapped to the one or more bins; and
      distributing, among the one or more nodes, the key-value pairs in the plurality of key-value pairs that are categorized into the one or more bins.

7. The method of claim 6, wherein distributing the key-value pairs that are categorized into the one or more bins includes:
   identifying one or more key-value pairs, in the plurality of key-value pairs, that are associated with one or more remote nodes;
   transmitting the one or more key-value pairs to the one or more remote nodes; and
   deleting the one or more key-value pairs from a memory of the node.

8. The method of claim 7, wherein distributing the key-value pairs that are categorized into the one or more bins further includes:
   identifying at least one key-value pair of the plurality of key-value pairs associated with the node; and
   maintaining the at least one key-value pair on the node, the at least one key-value pair forming at least a portion of the subset of the plurality of key-value pairs.

9. The method of claim 1, wherein the job is a first job, the set of nodes is a first set of nodes, the set of indexed key-value pairs is a first set of indexed key-value pairs, and the result is a first result; and further comprising:
   generating the plurality of key-value pairs again as part of a second job; and
   performing the second job at least in part by organizing the plurality of key-value pairs among a second set of nodes using the organizational process to generate a second set of indexed key-value pairs, wherein the second set of nodes has a different number of nodes than the first set of nodes, and wherein the second set of indexed key-value pairs are the same as the first set of indexed key-value pairs and usable to determine a second result of the second job that is the same as the first result of the first job.

10. The method of claim 1, wherein sorting the subset of the plurality of key-value pairs by at least one of hashed key or key comprises:
   ordering the subset of the plurality of key-value pairs by their respective hashed keys to generate an ordered list of key-value pairs;

identifying one or more sets of key-value pairs within the ordered list of key-value pairs having a same hashed key but at least two different keys; and further arranging the one or more sets of key-value pairs within the ordered list of key-value pairs by their respective key to generate the sorted key-value pairs.

11. A non-transitory computer readable medium comprising instructions for distributing data among nodes in a distributed computing environment to provide for stable data processing, the instructions being executable by a processing device of a node in the distributed computing environment for causing the processing device to:

generate a plurality of key-value pairs as part of a job, each key-value pair of the plurality of key-value pairs having a respective hashed key and a corresponding value; and perform the job at least in part by organizing the plurality of key-value pairs among a set of nodes in the distributed computing environment using an organizational process that includes:

categorizing the plurality of key-value pairs into a plurality of bins, each key-value pair of the plurality of key-value pairs being categorized into a bin of the plurality of bins spanning a range of hashed keys that includes the respective hashed key;

determining that the set of nodes in the distributed computing environment are mapped to the plurality of bins, each bin of the plurality of bins being mapped to a single node of the set of nodes;

distributing each respective key-value pair in the plurality of key-value pairs to a respective node corresponding to a respective bin into which the respective key-value pair is categorized;

sorting a subset of the plurality of key-value pairs maintained on the node by at least one of hashed key or key to generate sorted key-value pairs; and assigning index values to the sorted key-value pairs in an ascending order or a descending order and based on a predetermined rank of the node among the set of nodes to generate a set of indexed key-value pairs, the set of indexed key-value pairs being usable to determine a result of the job.

12. The non-transitory computer readable medium of claim 11, further comprising instructions that are executable by the processing device for causing the processing device to generate the plurality of key-value pairs by:

receiving a plurality of unhashed key-value pairs having keys and values; and hashing the unhashed keys in the plurality of unhashed key-value pairs using a hashing scheme to form the plurality of key-value pairs.

13. The non-transitory computer readable medium of claim 12, further comprising instructions that are executable by the processing device for causing the processing device to determine a range of possible hashed keys based on the hashing scheme, the range of possible hashed keys spanning from a lowest possible hashed key that is createable using the hashing scheme to a highest possible hashed key that is createable using the hashing scheme.

14. The non-transitory computer readable medium of claim 13, further comprising instructions that are executable by the processing device for causing the processing device to determine a number of processing groups by:

identifying a group of nodes in the distributed computing environment to be used to process the plurality of key-value pairs;

determining a number of nodes in the group of nodes;

identifying a plurality of processing phases to be executed to process the plurality of key-value pairs;

determining a number of processing phases in the plurality of processing phases; and multiplying the number of nodes by the number of processing phases to determine the number of processing groups.

15. The non-transitory computer readable medium of claim 14, further comprising instructions that are executable by the processing device for causing the processing device to determine the plurality of bins by:

dividing the range of possible hashed keys by the number of processing groups to generate the plurality of bins, each bin in the plurality of bins spanning a portion of the range of possible hashed keys and being mapped to (i) a particular node in the group of nodes and (ii) a particular processing phase of the plurality of processing phases.

16. The non-transitory computer readable medium of claim 15, further comprising instructions that are executable by the processing device for causing the processing device to distribute each respective key-value pair in the plurality of key-value pairs to the respective node corresponding to the respective bin into which the respective key-value pair is categorized by:

executing the plurality of processing phases by, for each processing phase of the plurality of processing phases:
identifying one or more bins of the plurality of bins mapped to the processing phase;
identifying one or more nodes in the group of nodes mapped to the one or more bins; and
distributing, among the one or more nodes, the key-value pairs in the plurality of key-value pairs that are categorized into the one or more bins.

17. The non-transitory computer readable medium of claim 16, further comprising instructions that are executable by the processing device for causing the processing device to distribute the key-value pairs that are categorized into the one or more bins by:

identifying one or more key-value pairs, in the plurality of key-value pairs, that are associated with one or more remote nodes;

transmitting the one or more key-value pairs to the one or more remote nodes; and deleting the one or more key-value pairs from a memory of the node.

18. The non-transitory computer readable medium of claim 17, further comprising instructions that are executable by the processing device for causing the processing device to distribute the key-value pairs that are categorized into the one or more bins by:

identifying at least one key-value pair of the plurality of key-value pairs associated with the node; and maintaining the at least one key-value pair on the node, the at least one key-value pair forming at least a portion of the subset of the plurality of key-value pairs.

19. The non-transitory computer readable medium of claim 14, further comprising instructions that are executable by the processing device for causing the processing device to map the plurality of bins to fewer than all of the nodes in the group of nodes.

20. The non-transitory computer readable medium of claim 11, further comprising instructions that are executable by the processing device for causing the processing device to sort the subset of the plurality of key-value pairs by hashed key and key by:

ordering the subset of the plurality of key-value pairs by their respective hash keys to generate an ordered list of key-value pairs;

identifying one or more sets of key-value pairs within the ordered list of key-value pairs having a same hashed key but at least two different keys; and further arranging the one or more sets of key-value pairs within the ordered list of key-value pairs by their respective key to generate the sorted key-value pairs.

21. A node of a distributed computing environment, the node comprising:

a processing device; and a memory device on which instructions executable by the processing device are stored for causing the processing device to:

generate a plurality of key-value pairs as part of a job, each key-value pair of the plurality of key-value pairs having a respective hashed key and a corresponding value; and perform the job at least in part by organizing the plurality of key-value pairs among a set of nodes in the distributed computing environment using an organizational process that includes:

categorizing the plurality of key-value pairs into a plurality of bins, each key-value pair of the plurality of key-value pairs being categorized into a bin of the plurality of bins spanning a range of hashed keys that includes the respective hashed key;

determining that the set of nodes in the distributed computing environment are mapped to the plurality of bins, each bin of the plurality of bins being mapped to a single node of the set of nodes;

distributing each respective key-value pair in the plurality of key-value pairs to a respective node corresponding to a respective bin into which the respective key-value pair is categorized;

sorting a subset of the plurality of key-value pairs maintained on the node by at least one of hashed key or key to generate sorted key-value pairs; and assigning index values to the sorted key-value pairs in an ascending order or a descending order and based on a predetermined rank of the node among the set of nodes to generate a set of indexed key-value pairs, the set of indexed key-value pairs being usable to determine a result of the job.

22. The node of claim 21, wherein the memory device further comprises instructions that are executable by the processing device for causing the processing device to generate the plurality of key-value pairs by:

receiving a plurality of unhashed key-value pairs having keys and values; and hashing the keys in the plurality of unhashed key-value pairs using a hashing scheme to form the plurality of key-value pairs.

23. The node of claim 22, wherein the memory device further comprises instructions that are executable by the processing device for causing the processing device to determine a range of possible hashed keys based on the hashing scheme, the range of possible hash keys spanning from a lowest possible hashed key that is createable using the hashing scheme to a highest possible hashed key that is createable using the hashing scheme.

24. The node of claim 23, wherein the memory device further comprises instructions that are executable by the processing device for causing the processing device to determine a number of processing groups by:

identifying a group of nodes in the distributed computing environment to be used to process the plurality of key-value pairs;

determining a number of nodes in the group of nodes;

identifying a plurality of processing phases to be executed to process the plurality of key-value pairs;

determining a number of processing phases in the plurality of processing phases; and multiplying the number of nodes by the number of processing phases to determine the number of processing groups.

25. The node of claim 24, wherein the memory device further comprises instructions that are executable by the processing device for causing the processing device to determine the plurality of bins by:

dividing the range of possible hashed keys by the number of processing groups to generate the plurality of bins, each bin in the plurality of bins spanning a portion of the range of possible hashed keys and being mapped to (i) a particular node in the group of nodes and (ii) a particular processing phase of the plurality of processing phases.

26. The node of claim 25, wherein the memory device further comprises instructions that are executable by the processing device for causing the processing device to distribute each respective key-value pair in the plurality of key-value pairs to the respective node corresponding to the respective bin into which the respective key-value pair is categorized by:

executing the plurality of processing phases by, for each processing phase of the plurality of processing phases:
identifying one or more bins of the plurality of bins mapped to the processing phase;
identifying one or more nodes in the group of nodes mapped to the one or more bins; and
distributing, among the one or more nodes, the key-value pairs in the plurality of key-value pairs that are categorized into the one or more bins.

27. The node of claim 26, wherein the memory device further comprises instructions that are executable by the processing device for causing the processing device to distribute the key-value pairs that are categorized into the one or more bins by:

identifying one or more key-value pairs, in the plurality of key-value pairs, that are associated with one or more remote nodes;

transmitting the one or more key-value pairs to the one or more remote nodes; and deleting the one or more key-value pairs from a memory of the node.

28. The node of claim 27, wherein the memory device further comprises instructions that are executable by the processing device for causing the processing device to distribute the key-value pairs that are categorized into the one or more bins by:

identifying at least one key-value pair of the plurality of key-value pairs associated with the node; and maintaining the at least one key-value pair on the node, the at least one key-value pair forming at least a portion of the subset of the plurality of key-value pairs.

29. The node of claim 24, wherein the memory device further comprises instructions that are executable by the processing device for causing the processing device to map the plurality of bins to fewer than all of the nodes in the group of nodes.

30. The node of claim 21, wherein the memory device further comprises instructions that are executable by the processing device for causing the processing device to sort the subset of the plurality of key-value pairs by at least one of hashed key or key by:
- ordering the subset of the plurality of key-value pairs by their respective hashed keys to generate an ordered list of key-value pairs;
- identifying one or more sets of key-value pairs within the ordered list of key-value pairs having a same hashed key but at least two different keys; and
- further arranging the one or more sets of key-value pairs within the ordered list of key-value pairs by their respective key to generate the sorted key-value pairs.

* * * * *